United States Patent [19]
Oguro

[11] Patent Number: 5,907,655
[45] Date of Patent: *May 25, 1999

[54] METHOD AND APPARATUS FOR RECORDING AND REPRODUCING DIGITAL VIDEO SIGNALS AS A FUNCTION OF COPY PROTECTION OF A TAPE

[75] Inventor: Masaki Oguro, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,354

[22] Filed: Sep. 30, 1996

[30] Foreign Application Priority Data

Oct. 5, 1995 [JP] Japan ................................... 7-284690

[51] Int. Cl.$^6$ ................ H04N 5/91; H04N 7/167; H04K 1/00
[52] U.S. Cl. ......................... 386/94; 380/5; 380/22
[58] Field of Search ..................... 386/1, 94–95, 386/98, 109, 111–112; 360/60; 380/3–5, 19–20, 22

[56] References Cited

U.S. PATENT DOCUMENTS

| | | | |
|---|---|---|---|
| 4,652,942 | 3/1987 | Eto | 386/124 |
| 5,315,448 | 5/1994 | Ryan | 380/5 |
| 5,418,853 | 5/1995 | Kanota et al. | 380/5 |
| 5,579,120 | 11/1996 | Oguro | 386/94 |
| 5,673,357 | 9/1997 | Shima | 386/94 |

*Primary Examiner*—Wendy Garber
*Assistant Examiner*—Luong Nguyen
*Attorney, Agent, or Firm*—Frommer Lawrence & Haug, LLP; William S. Frommer

[57] ABSTRACT

An apparatus records and reproduces digital video signals on a tape such that recording by another digital VTR or another analog VTR can be blocked, both through a digital interface and an analog interface, to provide a copy protection through various techniques, such as AGC or color striping. The digital recording format includes a recording area for encoded video signals and a recording area for auxiliary information configured in packs. A disturbance signal generating flag is included in an auxiliary information pack and recorded in the auxiliary information recording area. Based on the status of the flag, a disturbance signal may be inserted as a copy protection signal that is reproduced from the encoded video signals into the analog video signal.

9 Claims, 26 Drawing Sheets

(a) FOR APT = 000

(b) FOR AP1 = AP2 = AP3 = 0

| UPPER | LOWER | |
|---|---|---|
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | AAUX |
| 0 1 1 0 | x x x x | VAUX |
| 0 1 1 1 | x x x x | CAMERA |
| 1 0 0 0 | x x x x | LINE |
| 1 0 0 1 ⋮ 1 1 1 0 | x x x x ⋮ x x x x | RESERVED |
| 1 1 1 1 | a a a a | SOFT MODE |
| 1 1 1 1 | 1 1 1 1 | NO INFORAMTION | a a a a : 0 0 0 0 ~ 1 1 1 0
x x x x : 0 0 0 0 ~ 1 1 1 1

PRE SYNC BLOCK

POST SYNC BLOCK

◊ : AAUX
⧫ : AUDIO DATA

TRACK NUMBER →

| Pack\Track | 1 | 2 | 3 | 4 | 5 | 6 | 7 | 8 | 9 | 10 |
|---|---|---|---|---|---|---|---|---|---|---|
| 8 | 55 | f | 55 | | 55 | | 55 | | 55 | |
| 7 | 54 | e | 54 | | 54 | | 54 | | 54 | |
| 6 | 53 | d | 53 | | 53 | | 53 | | 53 | |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | c | 52 | i | 52 | | 52 | | 52 | | 52 |
| 1 | b | 51 | h | 51 | | 51 | | 51 | | 51 |
| 0 | a | 50 | g | 50 | | 50 | | 50 | | 50 |

↑ PACK NUMBER

FIG.13

VAUX SOURCE CONTPACK

| PC0 | 0 | 1 | 0 | 1 | 0 | 0 | 0 | 1 |
|---|---|---|---|---|---|---|---|---|
| PC1 | CGMS | | COPY SOURCE | | COPY GEN | | SS | |
| PC2 | REC ST | RI | REC MODE | | 1 | DISP | | |
| PC3 | FF | FS | FC | IL | ST | SC | BCSYS | |
| PC4 | 1 | GENRE CATEGORY | | | | | | |

CGMS :
  UPPER ORDER BITS : 0 = NO COPY RIGHT
                     1 = COPY RIGHT
  LOWER ORDER BITS : 0 = ORIGINAL
                     1 = NOT ORIGINAL

RI(REC INHIBIT) :
  0 = DUBBING INHIBITED
      (AGC + COLOR STRIPE GENERATED)
  1 = DUBBING POSSIBLE

FIG.14

VAUX SOURCE CONTPACK

| PC0 | 0 | 1 | 0 | 1 | 0 | 0 | 0 | 1 |
|---|---|---|---|---|---|---|---|---|
| PC1 | CGMS | | COPY SOURCE | | COPY GEN | | SS | |
| PC2 | REC ST | AG | REC MODE | | CS | DISP | | |
| PC3 | FF | FS | FC | IL | ST | SC | BCSYS | |
| PC4 | 1 | GENRE CATEGORY | | | | | | |

CGMS :
  UPPER ORDER BITS : 0 = NO COPY RIGHT
                     1 = COPY RIGHT
  LOWER ORDER BITS : 0 = ORIGINAL
                     1 = NOT ORIGINAL

AG(AGC BIT) :
  0 = AGC GENERATED
  1 = AGC NOT GENERATED

CS(COLOR STRIPE BIT) :
  0 = COLOR STRIPE GENERATED
  1 = COLOR STRIPE NOT GENERATED

FIG.15

|  | MSB | | | | | | | LSB |
|---|---|---|---|---|---|---|---|---|
| PC0 | 1 | 0 | 0 | 0 | 0 | 0 | 0 | 0 |
| PC1 | LINES ||||||||
| PC2 | BW | EN || CLF || CM |||
| PC3 | TSD ||||||||
| PC4 | QU ||| SAMP |||||

FIG.20

|  | MSB | | | | | | | LSB |
|---|---|---|---|---|---|---|---|---|
| PC0 | 1 | 0 | 0 | 0 | 0 | 0 | 0 | 1 |
| PC1 | ||||||||
| PC2 | ||||||||
| PC3 | ||||||||
| PC4 | ||||||||

| | LINE 13 | | | | LINE 20 | |
|---|---|---|---|---|---|---|
| | MSB | LSB | | | MSB | LSB |
| LINE HEADER PACK | 10000000 | | | | 01010000 | |
| | 00001101 | LINES=13 | | LINES=20 | 00010100 | |
| | 11110000 | ←B/W=1, EN=INVALID, CLF=INVALID, CM=0→ | | | 11110000 | |
| | 01001000 | ← TSD=72 → | | | 01001000 | |
| | 01011000 | ← QU=4BITS, SAMPLING f=1.35MHz → | | | 01011000 | |
| LINE DATA PACK FOR Y | 10000001 | | | | 10000001 | |
| | S2 | S1 | | | S2 | S1 |
| | S4 | S3 | SAMPLE DATA 1~8 | | S4 | S3 |
| | S6 | S5 | | | S6 | S5 |
| | S8 | S7 | | | S8 | S7 |
| LINE DATA PACK FOR Y | 10000001 | | | | 10000001 | |
| | S10 | S9 | | | S10 | S9 |
| | S12 | S11 | SAMPLE DATA 9~16 | | S12 | S11 |
| | S14 | S12 | | | S14 | S12 |
| | S16 | S15 | | | S16 | S15 |
| LINE DATA PACK FOR Y | 10000001 | | | | 10000001 | |
| | S18 | S17 | | | S18 | S17 |
| | S20 | S19 | SAMPLE DATA 17~24 | | S20 | S19 |
| | S22 | S21 | | | S22 | S21 |
| | S24 | S23 | | | S24 | S23 |
| LINE DATA PACK FOR Y | 10000001 | | | | 10000001 | |
| | S26 | S25 | | | S26 | S25 |
| | S28 | S27 | SAMPLE DATA 25~32 | | S28 | S27 |
| | S30 | S29 | | | S30 | S29 |
| | S32 | S31 | | | S32 | S31 |
| LINE DATA PACK FOR Y | 10000001 | | | | 10000001 | |
| | S34 | S33 | | | S34 | S33 |
| | S36 | S35 | SAMPLE DATA 33~40 | | S36 | S35 |
| | S38 | S37 | | | S38 | S37 |
| | S40 | S39 | | | S40 | S39 |
| LINE DATA PACK FOR Y | 10000001 | | | | 10000001 | |
| | S42 | S41 | | | S42 | S41 |
| | S44 | S43 | SAMPLE DATA 41~48 | | S44 | S43 |
| | S46 | S45 | | | S46 | S45 |
| | S48 | S47 | | | S48 | S47 |
| LINE DATA PACK FOR Y | 10000001 | | | | 10000001 | |
| | S50 | S49 | | | S50 | S49 |
| | S52 | S51 | SAMPLE DATA 49~56 | | S52 | S51 |
| | S54 | S53 | | | S54 | S53 |
| | S56 | S55 | | | S56 | S55 |
| LINE DATA PACK FOR Y | 10000001 | | | | 10000001 | |
| | S58 | S57 | | | S58 | S57 |
| | S60 | S59 | SAMPLE DATA 57~64 | | S60 | S59 |
| | S62 | S51 | | | S62 | S51 |
| | S64 | S53 | | | S64 | S53 |
| LINE DATA PACK FOR Y | 10000001 | | | | 10000001 | |
| | S66 | S65 | | | S66 | S65 |
| | S68 | S67 | SAMPLE DATA 65~72 | | S68 | S67 |
| | S70 | S69 | | | S70 | S69 |
| | S72 | S71 | | | S72 | S71 |

LINE NUMBER ARE EXEMPLARY

| TRACK NO. → | 1 | 2 | 3 | 4 | 5 | 6 | 7 | 8 | 9 | 10 |
|---|---|---|---|---|---|---|---|---|---|---|
| | 65 | Y | 65 | | 65 | | 65 | | 65 | |
| | 64 | Y | 64 | | 64 | | 64 | | 64 | |
| | 63 | Y | 63 | | 63 | | 63 | | 63 | |
| | 62 | Y | 62 | | 62 | | 62 | | 62 | |
| 40 | 61 | Y | 61 | | 61 | | 61 | | 61 | |
| | 60 | Y | 60 | | 60 | | 60 | | 60 | |
| | Y | Y | | | | | | | | |
| | Y | LH | | | | | | | | |
| | Y | Y | | | | | | | | |
| 35 | Y | Y | | | | | | | | |
| | Y | Y | | | | | | | | |
| | Y | Y | | | | | | | | |
| | Y | Y | | | | | | | | |
| | Y | Y | | | | | | | | |
| 30 | LH | Y | | | | | | | | |
| | Y | Y | | | | | | | | |
| | Y | Y | | | | | | | | |
| | Y | LH | | | | | | | | |
| | Y | Y | | | | | | | | |
| 25 | Y | Y | | | | | | | | |
| | Y | Y | | | | | | | | |
| | Y | Y | | | | | | | | |
| | Y | Y | | | | | | | | |
| | Y | Y | | | | | | | | |
| 20 | LH | Y | | | | | | | | |
| | Y | Y | | | | | | | | |
| | Y | Y | | | | | | | | |
| | Y | LH | | | | | | | | |
| | Y | Y | | | | | | | | |
| 15 | Y | Y | | | | | | | | |
| | Y | Y | | | | | | | | |
| | Y | Y | | | | | | | | |
| | Y | Y | | | | | | | | |
| | Y | Y | | | | | | | | |
| 10 | LH | Y | | | | | | | | |
| | Y | Y | | | | | | | | |
| | Y | Y | | | | | | | | |
| | Y | LH | | | | | | | | |
| | Y | Y | | | | | | | | |
| 5 | Y | 65 | | 65 | | 65 | | 65 | | 65 |
| | Y | 64 | | 64 | | 64 | | 64 | | 64 |
| | Y | 63 | | 63 | | 63 | | 63 | | 63 |
| | Y | 62 | | 62 | | 62 | | 62 | | 62 |
| | Y | 61 | Y | 61 | | 61 | | 61 | | 61 |
| 0 | LH | 60 | Y | 60 | | 60 | | 60 | | 60 |

↑ PACK NO.

LH : LINE HEADDER PACK
Y : Y PACK

FIG.23

A : ANALOG VIDEO SIGNAL
B: ANALOG VIDEO SIGNAL INTO WHICH HAS BEEN
    INSERTED THE COPYRIGHT PROTECTION SIGNAL
C : ANALOG OR DIGITAL AUDIO SIGNAL
D : COPYRIGHT PROTECTION SIGNAL
    ( EXTRACTED FROM B AND DIGITIZED )
E : ANALOG VIDEO SIGNAL INTO WHICH HAS BEEN
    INSERTED THE COPYRIGHT PROTECTION SIGNAL

5,907,655
// 1

METHOD AND APPARATUS FOR RECORDING AND REPRODUCING DIGITAL VIDEO SIGNALS AS A FUNCTION OF COPY PROTECTION OF A TAPE

BACKGROUND OF THE INVENTION

This invention broadly relates to digital video tape recording and, in particular, to a method and apparatus for recording and reproducing video signals as a function of copy information associated with those video signals.

Two countermeasures, namely automatic gain control (AGC) and color striping, have been generally used for assuring copy protection of a video signal on an analog videotape recorder (VTR). That is, disturbance signals, which disturb the automatic gain control function of the recording VTR, are inserted in the blanking period of television signals for copy protection in a conventional analog VTR. If a pre-recorded video tape is dubbed illegally, i.e. without authorization, the recording made on the dubbed tape becomes non-reproducible, thus assuring copy protection.

A processing known as color striping has also been proposed, wherein the phase of the color sub-carrier signal is inverted every 20 lines in the effective viewing area. Although a television receiver is not affected by such processing because of non-acute AFC control, the phase-locked loop of the AFC circuit in a VTR tends to follow such phase inversion closely, causing the reversal of the color phase to produce color bands.

These measures, however, are effective only for analog video signals. That is, in a digital VTR having no analog input and only a digital interface, the disturbance signal has no prohibitive effect on the recording even if copy protection exists. Thus, when the digital video signals are restored and outputted as analog signals, subsequent recording can be done on the VTR even though the original analog signals were copy-protected.

OBJECTS OF THE INVENTION

It is therefore an object of the present invention to provide a recording and reproducing method and apparatus for digital video signals in which the copy protection function using techniques, such as AGC or color striping, can be effective in a digital VTR. That is, video recording can be inhibited, if desired, on another digital VTR or on a conventional analog VTR via a digital interface or an analog video output, respectively.

SUMMARY OF THE INVENTION

In accordance with the present invention, digital video signals are recorded on a record medium in a format which includes a recording area for encoded picture signals and a recording area for auxiliary information exhibiting a pack structure. An input video signal is encoded and recorded in the recording area for the encoded picture signal; and a disturbance signal flag for copy protection of the input picture signal is included in a pack for the auxiliary information and recorded in the auxiliary recording area. When the record medium is played back and the encoded picture signal is converted to analog form, a disturbance signal is inserted therein as a function of the disturbance signal generating flag reproduced from the auxiliary information recording area to disturb the analog recording of that analog video signal. As one aspect, the disturbance signal is inserted into the vertical blanking period of the video signal. As another aspect, if a disturbance signal is present in the vertical blanking period of an input analog video signal the disturbance signal generating flag in pack associated with the encoded video signal is set.

BRIEF DESCRIPTION OF THE DRAWINGS

The following detailed description, given by way of example and not intended to limit the present invention solely thereto, will best be understood in conjunction with the accompanying drawing wherein:

FIG. 5A and 5B illustrate the data structure on the track for APT=000.

FIG. 13 is a diagram of 9 packs of the audio auxiliary arrayed in the 10 tracks in which a video frame is recorded.

FIG. 14 is a diagram of the contents of one example of the VAUX SOURCE CONTROL pack.

FIG. 15 is a diagram of the contents of another example of the VAUX SOURCE CONTROL pack having two bits of AG and CS.

FIG. 20 is a diagram of a line header pack.

FIG. 21 is a diagram of a line header pack for the luminance component Y.

FIG. 22 shows a diagram of an example of data storage in an actual pack.

FIG. 23 is a diagram of an example of storage of a header pack and a data pack in a VAUX optional area.

DESCRIPTION OF THE PREFERRED EMBODIMENTS

Figure 1:
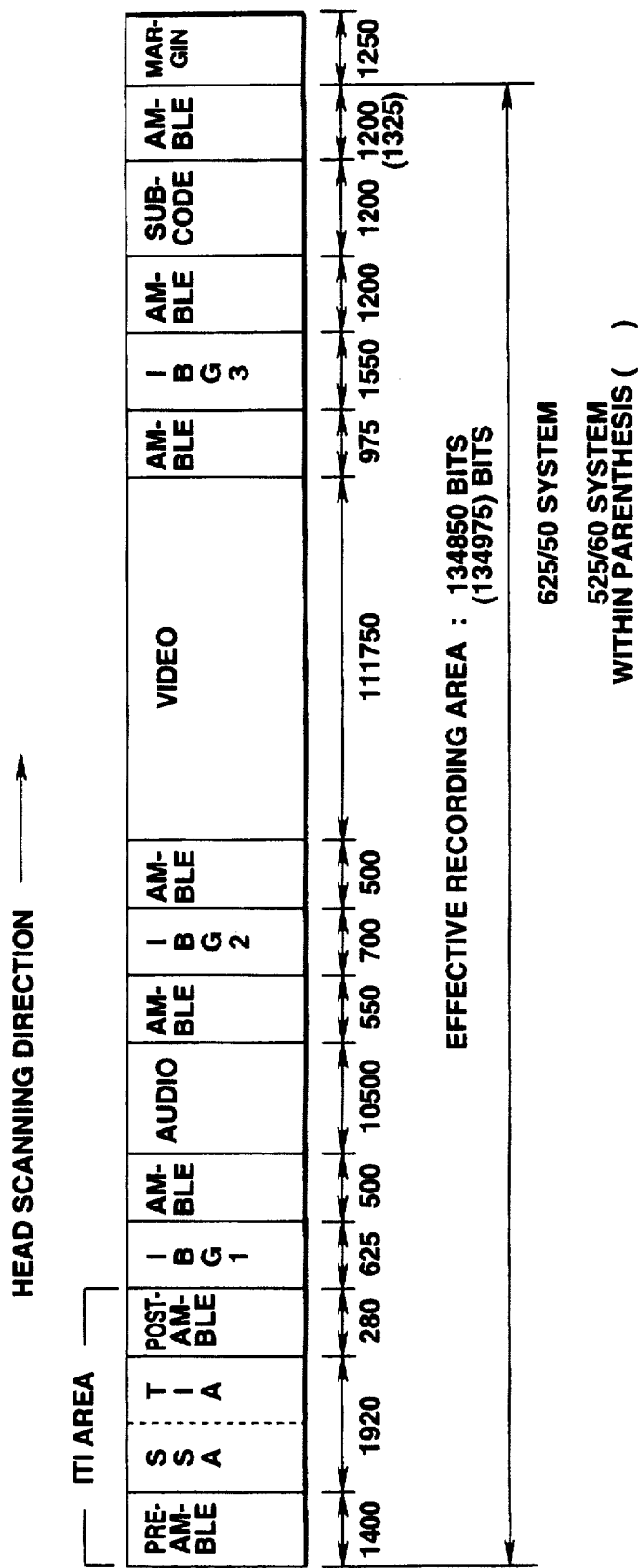
FIG. 1 is a diagram of a recording format on one track in a digital VTR embodying the present invention.

Referring to the drawings, preferred embodiments of the present invention will now be explained in detail.

To facilitate the description of the present invention, the recording format of a digital VTR according to the present invention will be explained next. As the track recording format of FIG. 1 shows, margins are formed on both ends of the track. In the head scanning direction there are an ITI area which is useful for performing after-recording, an audio area for recording audio signals, a video area for recording picture signals and a sub-code area for recording subsidiary (or control) data. Between the respective areas are formed inter-block gaps (IBG1 to IBG3) for providing buffers therebetween. Ten tracks make up a frame for video signals of the 525/60 system, while twelve tracks make up a frame for video signals of the 625/60 system.

The signals recorded in each area are described next.

The insert and track information (ITI) recorded at the beginning portion of a track is a timing block used for reliably performing the after-recording. The purpose of the ITI is to assure proper area positioning in readiness for re-writing the video data or the audio data written sequentially. The digital VTR may be configured for any apparatus other than the recording/reproducing apparatus for digital video signals and digital speech signals; and this configuration is represented by an application ID. Data rewriting in a particular area is important for such versatility. For this reason, the ITI area is provided at a track inlet.

In the ITI area, a large number of SYNC blocks of short length is written, and the SYNC numbers are appended sequentially beginning from the track inlet. If any of the SYNC blocks of the ITI area is detected at the time of after-recording, the current position on the track can be accurately identified from the number written therein. The after-recording area can be identified accordingly. In general, the track inlet does not permit precise detection due to insufficient mechanical accuracy and less than ideal head-to-tape contact. Consequently, a large number of SYNC blocks of short length is written in the ITI area for increasing the detection probability.

Figure 2:
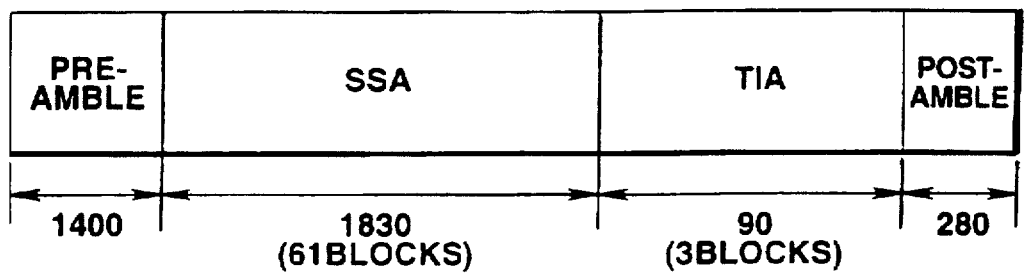
FIG. 2 is a diagram of the structure of the ITI area shown in FIG. 1.

The ITI area is made up of four portions, as shown in FIG. 2. The ITI area begins with a 1400 bit preamble operating as PLL synchronizing information for digital signals. The preamble is directly followed by a start-SYNC block area (SSA) made up of 61 SYNC blocks, each SYNC block being made up of 30 bits. The SSA is directly followed by a track information area TIA made up of 3 SYNC blocks (90 bits). The TIA is adapted to store information relating to the entire track. In each SYNC block of the TIA are stored a 3- bit application ID of a track (APT), 1 bit of standard play/long play (SP/LP) representing the track pitch, 1 reserve bit and 1 pilot frame (PF) bit representing a reference for the servo system. The ITI area terminates with 280 bits of a postamble.

As is known from Japanese Patent application 5-277633 or Japanese Patent application 6-82576, incorporated herein by reference, digital video cassette, on which tracks exhibiting the format of FIG. 1 may be recorded, is provided with a memory IC on which data is written for assisting the recording/reproduction. This memory IC is known as a memory-in-cassette (MIC).

The aforementioned application ID is stored not only in the APT of the TIA area but also in this MIC, as application ID of MIC (APM), in the upper three bits of a predetermined address, such as address 0.

The application ID need not identify a particular application of the digital VTR, but may be an ID identifying the data structure of the respective areas recorded in each track on the recording medium. Therefore, the APT and APM have the following meanings:

APT . . . identifies the data structure on a track;

APM . . . identifies the MIC data structure.

Figure 3:
FIG. 3 is a diagram of the data structure on the track as set by the application data APT.

A typical track is divided downstream of the ITI area into plural areas, as shown in FIG. 3, and the APT uniquely identifies the data structure, such as the positions of these areas on the track, the SYNC block structure or the ECC structure for error-protecting the data in these areas. The application ID identifies the data structure of a respective area and has the following meaning:

Application ID of area n . . . identifies the data structure of the area n.

Figure 4:
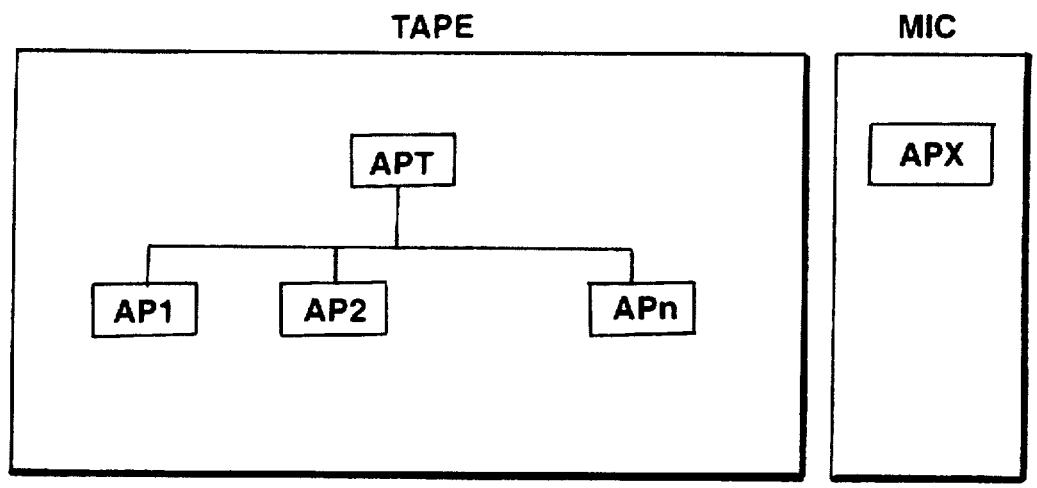
FIG. 4 is a diagram of the structure of an application ID.

The application ID on the tape has a hierarchical structure as shown in FIG. 4. That is, the areas on a track are identified by APT which is an original application ID, and in each 1 to n area, AP1 to APn are further defined. Although FIG. 4 shows a two-layered structure, an additional lower layer may also be provided, if so desired. Conversely, there is only one layer for the APM which is the application ID in the MIC. The same value as that of the APT is written into APM.

Using this application ID system, it is not difficult to adapt a digital VTR for various uses, not limited solely to video recording, such as a data streamer or a multi-track digital audio tape recorder, which using the same cassette, mechanics, servo system and ITI area generating and detecting circuit of the digital video recorder. In addition, the contents of each area are readily identified by the application ID of the area. An extremely wide range of commercial products becomes possible, since a certain value of the application ID identifies video data while another value of the application ID identifies audio data or computer data or the like.

Figures 5, 6:
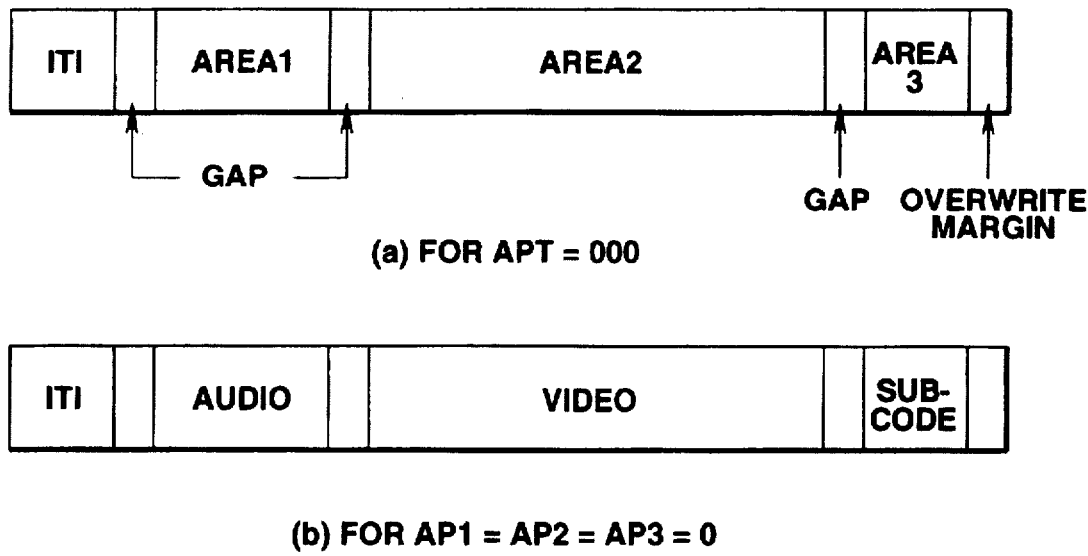
FIG. 6 illustrates the structure of pack data.

FIG. 5 shows the structure of a track for APT=000, which defines the areas 1, 2 and 3 on the track. This determines the positions of the areas on the track, the SYNC block structure, the ECC configuration for protecting data from errors, the gap for assuring the respective areas and an overwrite margin for assuring overwriting. In addition, each area has an application ID for identifying the area data structure of that area. The application IDs have the following meanings:

AP1 identifies the data structure for area 1;

AP2 identifies the data structure for area 2;

AP3 identifies the data structure for area 3.

The application IDs of the respective areas, which are 000, define the following:

AP1=000 . . . defines the data structure of the AAUX region.

AP2=000 . . . defines the data structure of the VAUX region.

AP3=000 . . . defines the data structure of the sub-code region.

AAUX is the audio auxiliary data, and VAUX is the video auxiliary data.

The respective areas of AAUX, VAUX, sub-code and MIC contain data which exhibit a common pack structure. Referring to FIG. 6, each pack is made up of 5 bytes PC0 to PC4, with the leading one byte (PC0) being a header and the remaining four bytes (PC1 to PC4) being data.

Figures 7, 8:
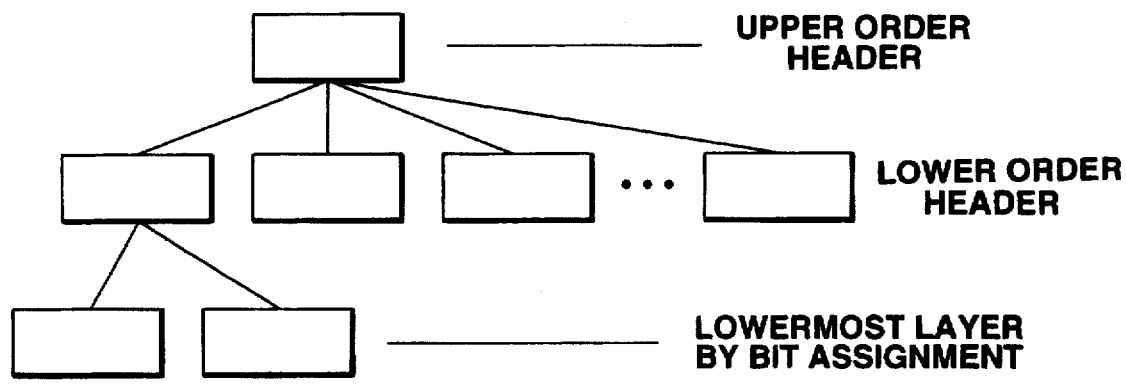
FIG. 7 illustrates the hierarchical structure of a header.
FIG. 8 illustrates a portion of a pack header table.

The 8 header bits of PC0 are divided into 4 upper bits and 4 lower bits. Referring to FIG. 7, the 4 upper bits and the 4 lower bits constitute an upper order header and a lower order header, respectively. In addition, extension to an additional lower layer becomes possible by data bit assignment. This layering systematizes the contents of a pack, while facilitating pack expansion. The 256-space defined by the upper and lower headers is prepared as a single pack header table and FIG. 8 illustrates this table along with the contents of the respective packs.

FIG. 8 shows a significant portion of the pack header table, in which the upper four bits and the lower four bits are called the large item and the small item, respectively. The large items, made up of the upper four bits, indicate the usage, for example, of succeeding data, while the small items, made up of the lower four bits, indicate the contents, for example, of succeeding data.

The large items include control "0000", title "0001", chapter "0010", part "0011", program "0100", audio auxiliary data (AAUX) "0101", video auxiliary data (VAUX) "0110", camera "0111", line "1000" and soft mode "1111", as shown in FIG. 8.

In the large items of, for example, the audio auxiliary data "0101" and the video auxiliary data "0110", there are small items, such as recording signal source "0000", source control "0001", recording date "0010" and recording time "0011".

Figure 9:
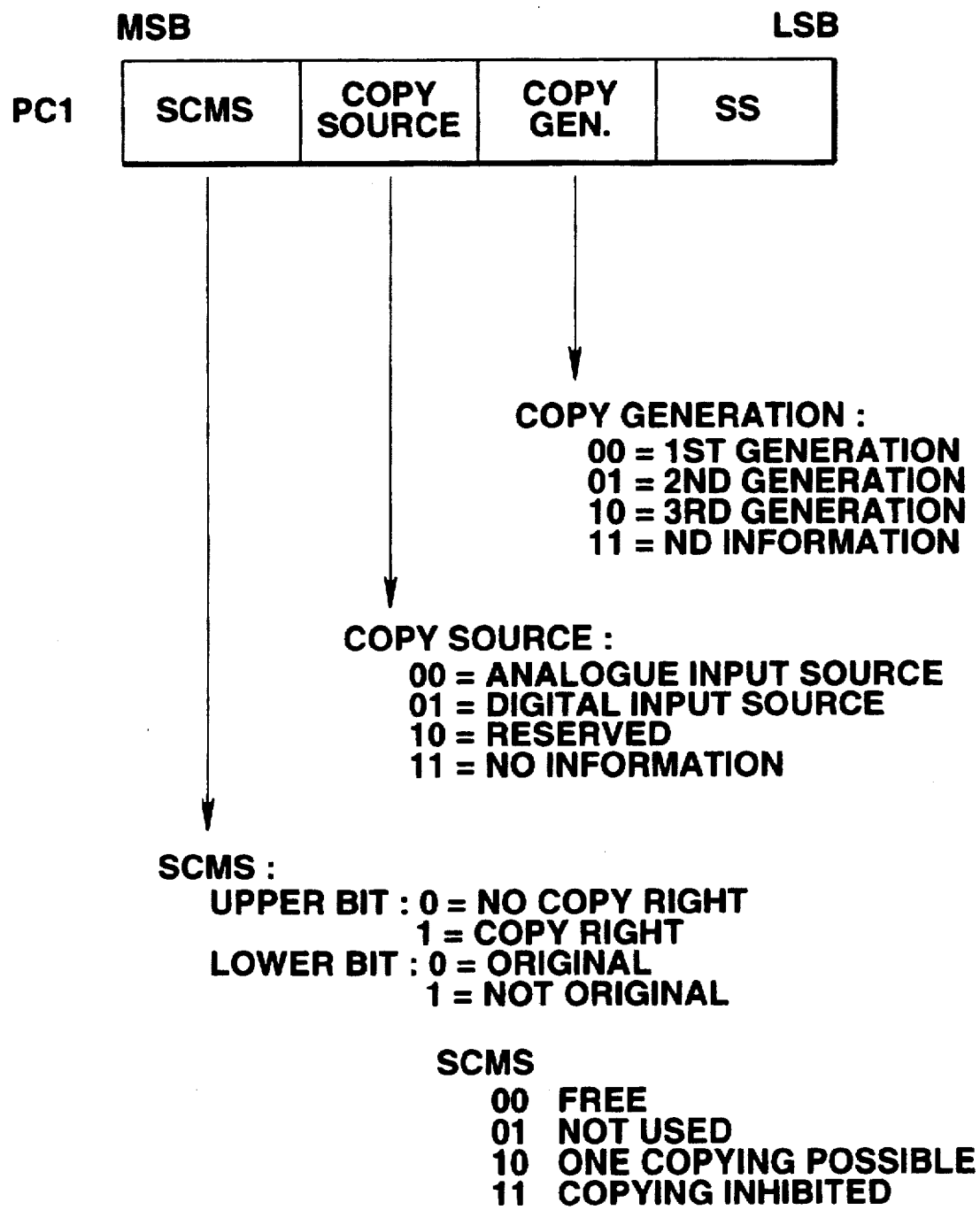
FIG. 9 represents the PC1 data of a source control pack of audio ancillary data and video auxiliary data.

FIG. 9 shows the source control pack PC1 of the audio auxiliary data and the video auxiliary data. In this pack, there are 2 bits of SCMS data, 2 bits of copy source data, 2 bits of copy generation data, 1 bit of cipher type data and 1 bit of cipher data.

The large item line "1000" has small items, such as line header "0000", Y "0001", R-Y "0010", B-Y "0011", R "0101", G "0110" and B "0111". The large item of line "1000" can represent data obtained by sampling an arbitrary line in a vertical blanking period or an effective scanning period in a television signal, or by sampling data of picture signals other than television signals.

The large items "1001" to "1110" are left for future use. Thus, by defining a new header using currently undefined item codes, such as those having the large items "1001" to "1110", new uses representing different data recording can be made in the future.

The pack structure is basically of a fixed 5-byte length. An exception, a pack structure of variable length may be used when describing character data in the MIC for effectively utilizing the limited memory capacity of the MIC.

Figure 10:
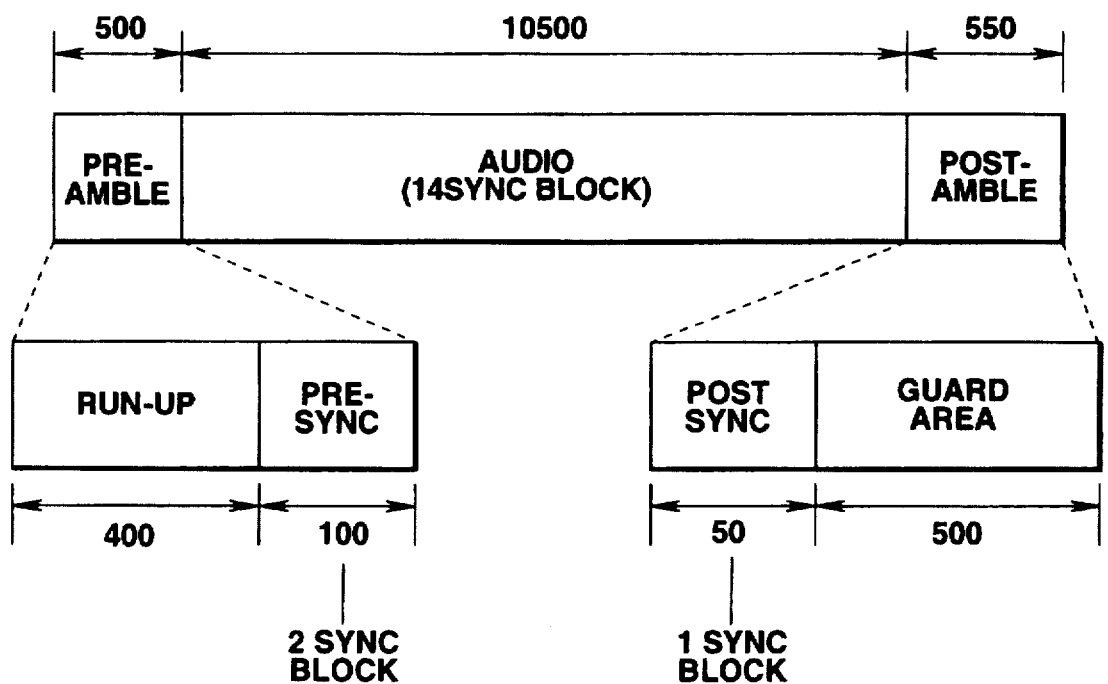
FIG. 10 is a diagram of the audio area of FIG. 1.

The respective audio and video areas are referred to as audio and video "sectors". The audio sector is structured as shown in FIG. 10, with a preamble made up of 500 bits, of which 400 bits are run-up bits and the remaining bits are two pre-SYNC blocks. The run-up bits are used as a run-up pattern for PLL synchronization, while the pre-SYNC blocks used for pre-detection of the audio SYNC blocks. The trailing post-amble is made up of 550 bits, formed of one post-SYNC block and 500 bits of a guard area. The post-SYNC block permits the end of the audio sector to be confirmed by the ID SYNC number included in the post-SYNC block, while the guard area is used for guarding the audio sector at the time of after-recording of the downstream side video sector.

Figure 11A:
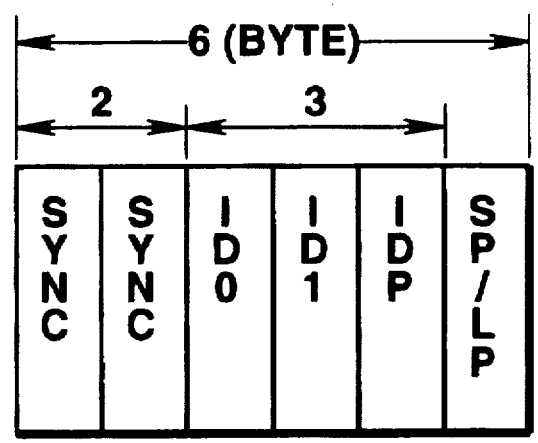
FIGS. 11A and 11B illustrate the pre-SYNC and post-SYNC blocks, respectively, shown in FIG. 10.
Figure 11B:
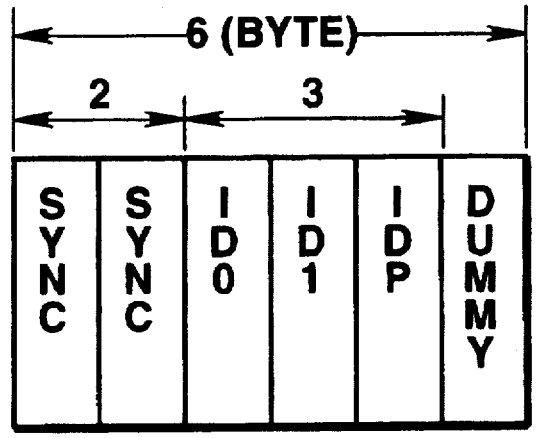

The pre-SYNC and post-SYNC blocks are each made up of 6 bytes, as shown in FIGS. 11A and 11B. The sixth byte of the pre-SYNC block is an SP/LP discrimination byte. FFh and 00h (hexadecimal code) denote SP and LP, respectively. The sixth byte of the post-SYNC block stores FFh as dummy data.

The respective six bytes of the pre-SYNC and post-SYNC blocks are recorded after 24 to 25 conversion (the modulation system of converting 24-bit data into 25-bit data and recording the resulting 25-bit data). Thus, the total bit length of the pre-SYNC and the post-SYNC becomes 6×2×8×25+24=100 bits and 6×1×8×25+24=50 bits, respectively.

Figure 12A:
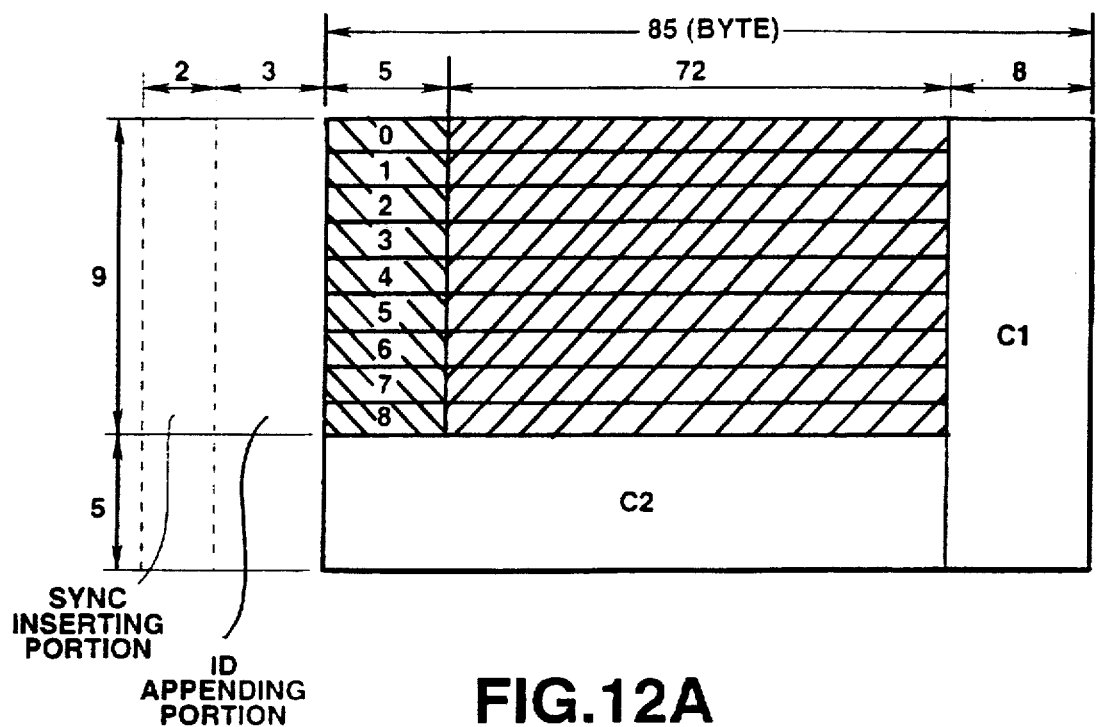
FIGS. 12A and 12B are diagrams of the area and each sync block included in a frame, respectively.
Figure 12B:
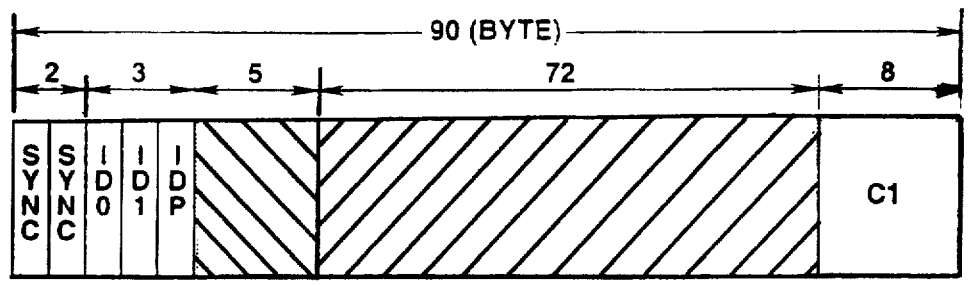

One audio SYNC block in the audio sector is formed of 90 bytes, as shown in FIG. 12. The first five bytes are configured similarly to the first five bytes of the pre-SYNC and post-SYNC blocks. The data portion of the SYNC block is formed of 77 bytes and error-protected by the horizontal parity C1 of 8 bytes and five lines of vertical parity C2 of 77×5 bytes.

The audio sector is made up of 14 SYNC blocks. Since recording is done after 24/25 conversion, the total bit length is 90×14×8×25+24=10500 bits.

The first 5 bytes of the data portion of the audio SYNC block constitutes one pack and is the audio auxiliary data. Nine of such packs are provided for each audio sector and the numbers 0 to 8 in FIG. 12 represent the pack numbers in the audio sector.

In FIG. 13, these 9 packs are extracted in the track direction. The numbers from 50 to 55 specify the values of the pack header in hexadecimal notation. The same pack is written ten times, once in each of the ten tracks. These rewritten packs are called the main area. Since essential items, such as the sampling frequency or the number of quantization bits necessary in reproducing audio signals, are stored in these packs, this data is written a large number of times for data protection. This enables data of the main area to be reproduced despite tape defects, such as scratches or channel clogging, for example.

The remaining packs are sequentially provided and are known as the optional area. These packs are provided in the order of a, b, c, d, e, f, . . . in the direction of the broken arrow, and skip the main area packs. For each video frame, an optional area of 30 packs and an optional area of 36 packs (e.g. 3 packs per track) are provided for the 525/60 system and for the 625/50 system, respectively. Since this is optional, the packs may be freely selected from those identified in the pack header table of FIG. 8.

For a data compression type digital VTR in which signal portions other than the image portion, such as the vertical blanking period, are discarded before the picture data is recorded, various auxiliary information inserted in the vertical blanking period (VBID data) is stored in a pack and then, upon reproduction, the stored information is restored into the vertical blanking period, as described, for example, in Japanese application 6-9991: As described therein, the VBID data is restored from packs in the main area (pack headers 61h, 61h).

The generation limiting signal CGMS which controls the number of generations that can be copied by digital dubbing is made up of two bits having the following meaning:

upper bit, representing no copy (for 0) and copy (for 1);

lower bit, representing original (for 0) and not original (for 1). The combination of these two bits has the following meaning:

00=dubbing free (e.g. unlimited dubbing)
01=not used
10=dubbing possible once
11=dubbing inhibited Based on these definitions, if the signal CGMS=10 (dubbing possible once) is sent from the reproducing digital VTR, the recording VTR records the reproduced picture data with CGMS=11. This inhibits the next digital dubbing of that re-recorded picture.

In the present invention, a VAUX control pack having the contents shown, for example, in FIG. 14 is employed.

The 2 bits of the CGMS data and 1 bit of a dubbing inhibiting (Rec Inhibit or RI) flag are provided. During reproduction, the two bits of the CGMS are directly copied in the VBID and inserted into a composite video output.

In addition, if RI bit="0", both AGC and color stripe signals are generated for protection.

FIG. 15 shows another example of the VAUX control pack, which, although substantially similar to the VAUX control pack shown in FIG. 14, includes b 2different bits in the PC2 byte: AG stands for the AGC disturbance signal generating flag and CS stands for the color stripe generating flag. Based on these two flags, both the AGC and the color stripe signals are generated when the reproduced digital picture signal subsequently is reproduced and converted to analog form to insure copy protection.

As known in the art, the color stripe system may not provide objectionable viewing for all color television receivers. Depending on the color television circuit types, color stripes appear on the screen due to AFC reaction even though the objective is not image recording. By providing the two flags AG and CS, it is possible to select whether both the AGC system and the color stripe system should be used for copy protection, or if only one of them should be adopted.

Figure 16:
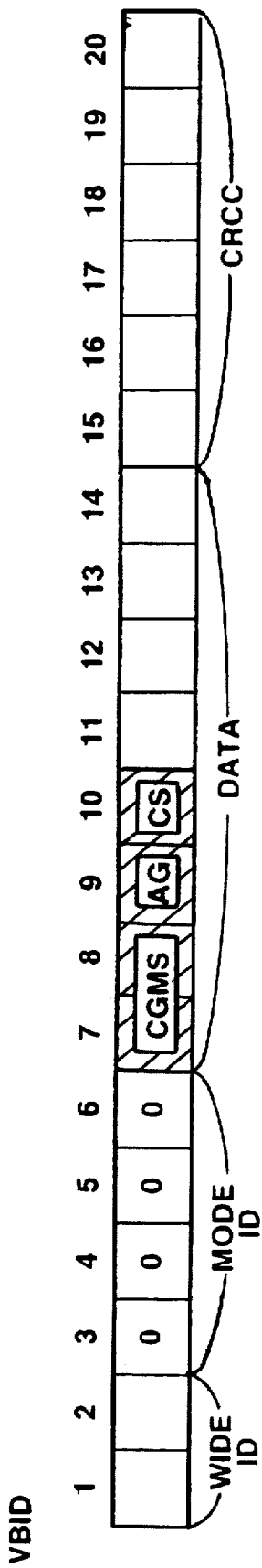
FIG. 16 is a diagram of the structure of VBID having AG and CSbits.

When using a digital VTR, copy intention may be demonstrated at the time of recording a second generation picture signal. FIG. 16 shows a construction of the VBID having these two AG and CS bits. If only a single RI bit is used, it is located in the AG field.

Figure 17:
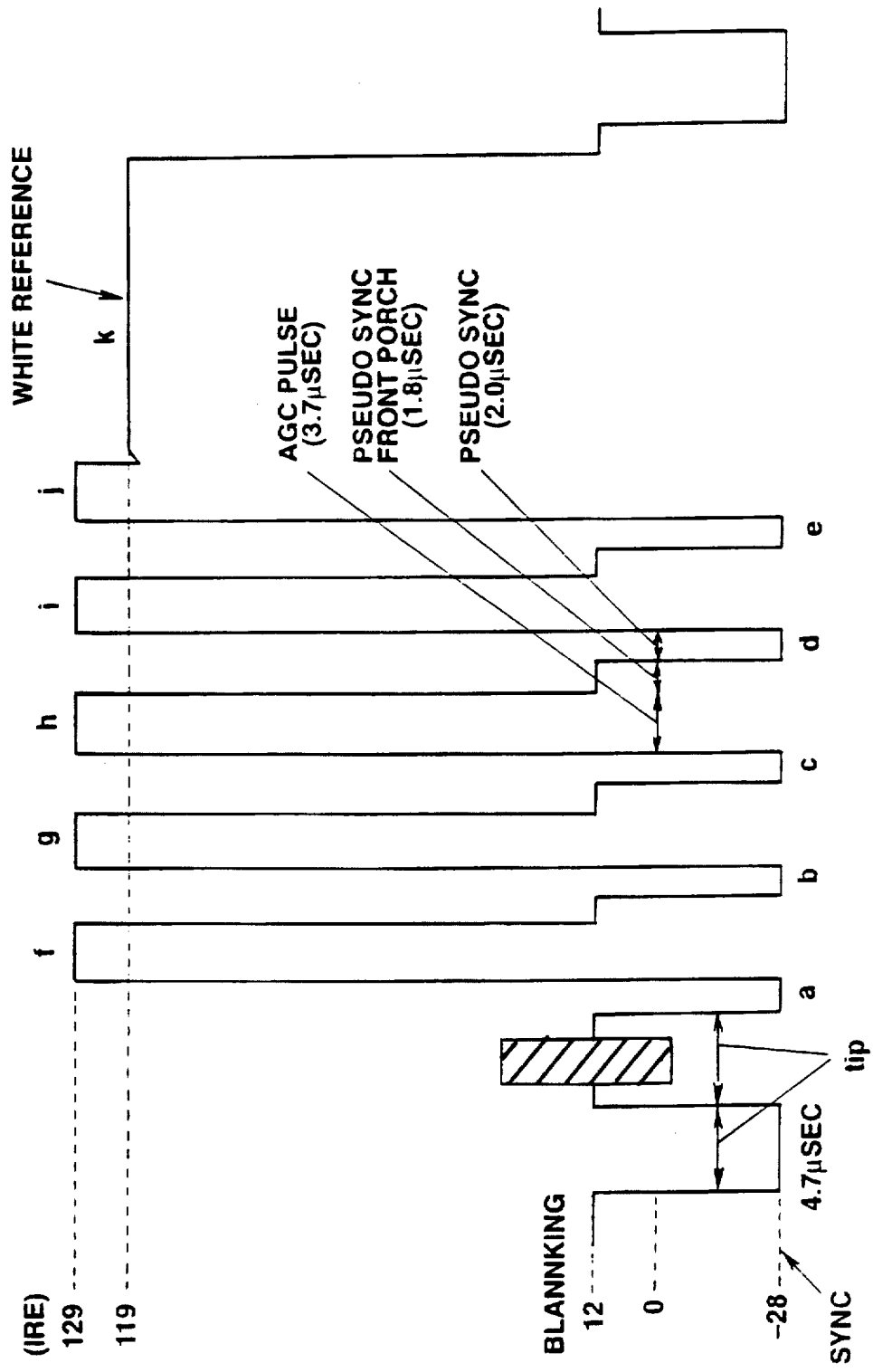
FIG. 17 is a waveform diagram for a copy protection signal.

Referring to FIG. 17, an example of a copy protection signal embodying the present invention is explained. With the copy protection signal, pseudo-horizontal synchronization pulses a, b, c, d and e are inserted at portions of the analog video signal, where such pulses are inherently not allowed to exist, for disturbing the servo circuit of the dubbing VTR. At the same time, AGC pulses f, g, h, i and j are inserted. Two modes are used: a pulsing mode in which the pulse level changes between two levels; and a standstill mode in which the signal level is at a constant level at the maximum 129 IRE or at a pedestal level 121 IRE. The standstill mode and the pulsing mode appear alternately in the video signal at an interval of approximately 45 seconds±15 seconds. Pulse level changes occur once or twice a second in the pulsing mode. In FIG. 17, k is termed the white reference and fixed at 119 IRE. However, this level is occasionally varied between 119 IRE and the 121 IRE pedestal level. As a result of such operation, the recording signal level of the dubbing VTR varies in a range of approximately 30% to 70% thus disabling regular recording.

The processing of sampling the copy protection signal, digitizing the sampled signal and packing the resulting digital signal in the pack structure will be described next.

The pseudo SYNC front porch of 1.8 $\mu$sec. represents the minimum sampling frequency, as shown in FIG. 17. Consequently, based upon conventional sampling theorem, the frequency of $2 \div (1.8 \times 10^6) = 1.111$ Mhz is required for proper reproduction.

Any one of the following four frequencies A to D may be used as the sampling frequency close to 1.11 MHz, thus satisfying the above condition:

(A) 72 fH=1.13 MHz;
(B) 858 fH/10=1.35 MHz;
(C) 858 fH=13.5 MHz (burst); and
(D) 3×32 fH=1.51 MHz It is noted that fH represents the horizontal synchronization signal frequency and is equal to 15.734 kHz in the case of the 525/60 system, while 858 fH is the picture sampling frequency for a digital VTR of 13.5 MHz. If a line is sampled by 13.5 MHz, 858 samples are obtained. On the other hand, 32 fH is a frequency already used in the United States for closed caption purposes.

The frequency (A) of 72 fH is the smallest frequency that is a multiple of fH that satisfies the above condition, while being locked to fH. However, a new PLL is required for generating this frequency. The frequency (B) of 858 fH/10 may be generated by a 1/10 frequency divider. However, the number of samples per line interval resulting from this frequency is a fractional number of 85.8 and "phase flow" is produced. The frequency (C) is generated by counting down the original sampling clocks of 13.5 MHz synchronized with the horizontal synchronization signal frequency of the input signal and by generating the clocks of 1.35 MHz at a pre-set sampling position. Although a decoder is required for countdown, "phase flow" is not produced, such that the circuit is simplified and possesses adequate reliability. The present embodiment uses this technique.

The particular sampling period of the copy protection signal shown in FIG. 17 may be any one of the following periods (E) to (G):

(E) 720/858 of one line;
(F) 35.7 $\mu$sec; or
(G) 58.2 $\mu$sec.

It is noted that (E) is an effective area adopted in a digital VTR. With (E), 720 of 858 samples in a line are rendered effective. In this case, the effective sampling position from the end of the horizontal synchronization signal is set. With (F), the pseudo SYNC pulses a to e are sampled, without sampling the white reference portion (k). With (G), sampling is performed up to the White Reference portion (k). Since (F) and (G) may not be precise, the period (E) is used in the present embodiment.

Figure 18:
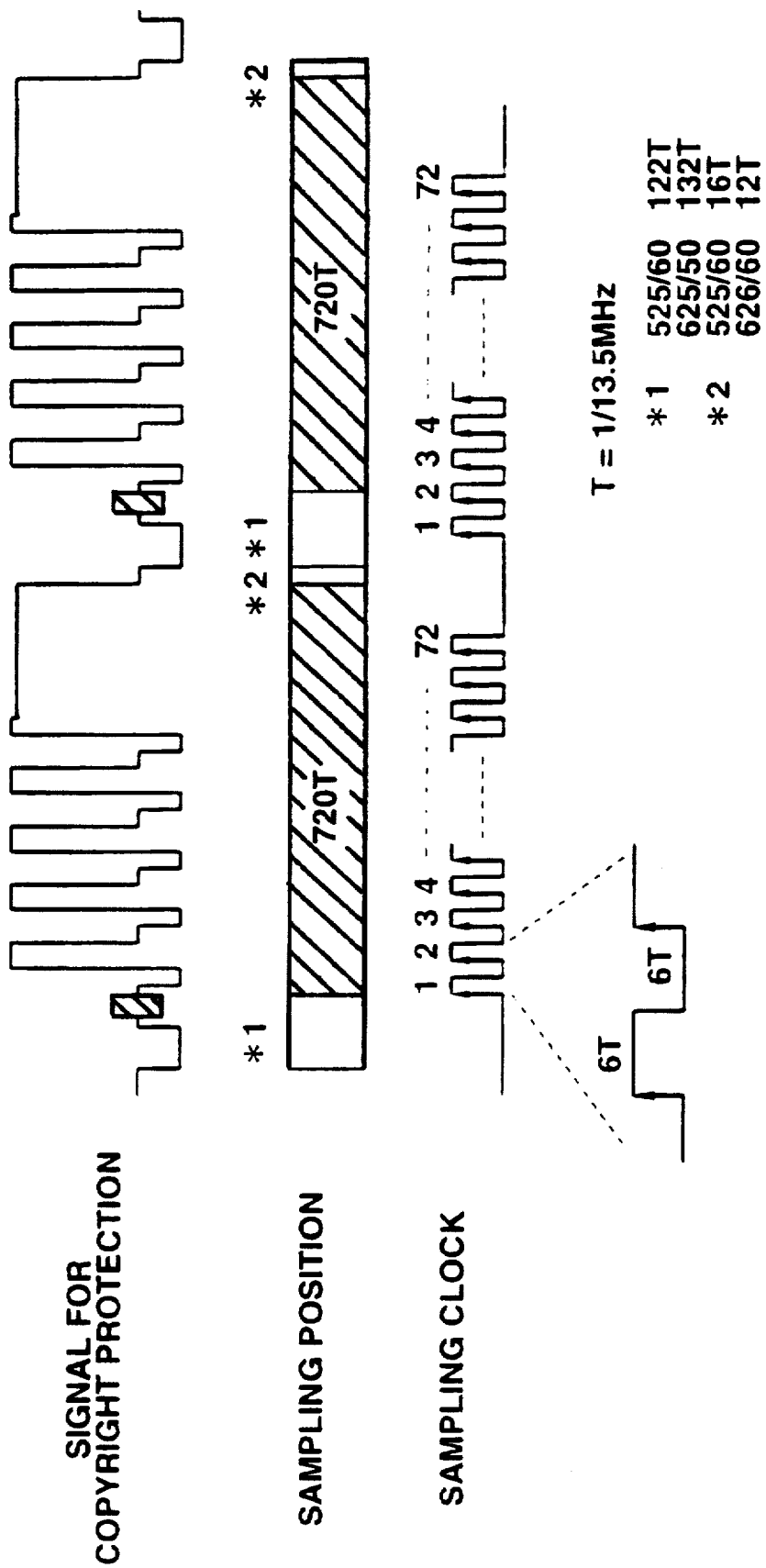
FIG. 18 illustrates the relation between the sampling period and the sampling pulse for the copy protection signal of FIG. 17.

FIG. 18 shows the relation between the sampling period (E) and the sampling pulse. The sampling position is shown for both the 525/60 (NTSC) system and the 626/50 (PAL and SECAM) system (the standard for the digital VTR). Seventy-two sampling clock signals are produced from a pre-set sampling position. The duty factor is preferably 5 T for the high (H) period and 5 T for the low (L) period (T=1/13.5 MHz), that is 50%.

As for the number of quantization bits for sampling, four bits, which are equal to one-half the number of quantization bits for video signals, suffices as is apparent from the signal properties shown in FIG. 17. Two quantization bits are insufficient, while 3, 5, 6 or 7 bits are not proper for the digital VTR having 8 bits as a processing unit. Thus, the present embodiment uses four quantization bits.

Figure 19:
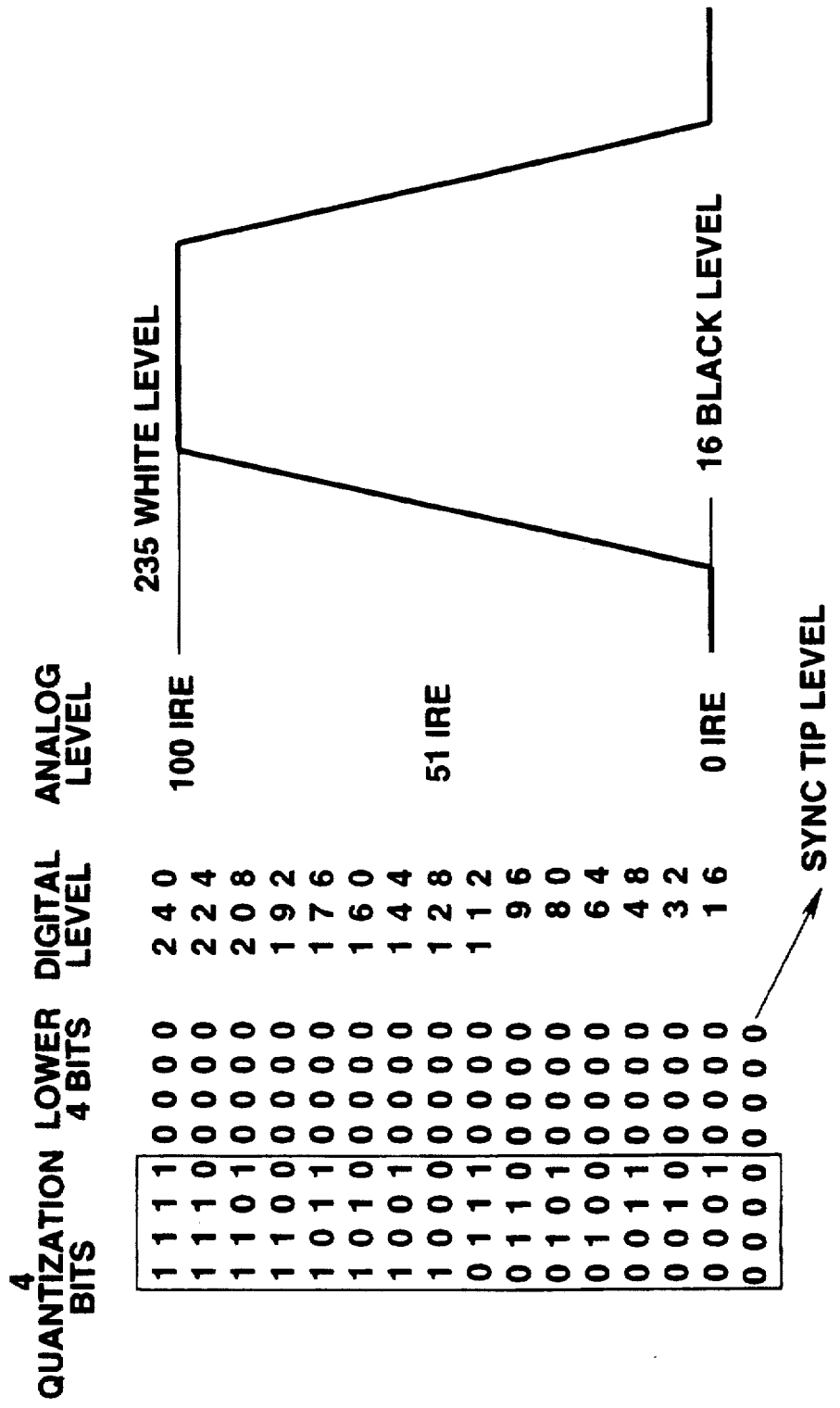
FIG. 19 illustrates how the data of the sampled and quantized copy protection signal is matched to the video signal.

FIG. 19 shows the matching of the sampled and quantized copy protection signal to video signals. That is, for matching the 4-bit sampled data to 8 video bits, "0000" is appended as the lower four bits to form 8-bit data. FIG. 19 also shows the digital level and the analog level of the luminance signal of a digital VTR from 0 IRE to 235 IRE relative to the digital level. If "0000" is appended as the lower four bits of the 4-bit data "0001" to form 8-bit data, the pedestal level defined.

In the copy protection signal shown in FIG. 17, the pseudo SYNC signals a to e are not changed in level. That is, the interval between the pedestal level and the SYNC tip level need not have high resolution. Thus, in the present embodiment, the SYNC tip level is represented by 4-bit data "0000" and the level higher than the pedestal level is represented by 15 levels of "0001" to "1111". This enables the higher level, rather than the pedestal level, to be represented relatively finely. If the entire level is quantized equally, digital values will be allocated to non-relevant portions, as a result of which levels higher than the pedestal level are coarse.

Meanwhile, with 8-bit data comprised of the 4 quantization bits "1111" and "0000" appended thereto, it is not possible to reproduce the level of 129 IRE in FIG. 17. But, FIG. 19 represents a standard for the digital VTR, so that it is possible to reproduce the level up to 110 IRE. This does not copy protection because for analog synthesis, it suffices to raise the level to 129 IRE by circuit design and hence no problem is introduced.

The line pack in which to store data thus produced is now explained. The line pack is formed by one type of the line header (pack header 80h) and six types of line data (pack header 81h for Y, a pack header 82h for R-Y, a pack header 83h for B-Y, a pack header 85h for R, a pack header 86h for G and a pack header 87h for B.

The line data for Y, R-Y and B-Y are for component signals for the digital VTR embodying the present invention, while line data for R, G and B are provided for computer usage. Of these line data packs, the line data pack for Y is used for copy protection, since only the Y-component suffices for reproducing the copy protection signal of FIG. 17.

The copy protection signal is inserted into the vertical blanking period of the video signal and, the line data pack is stored in an optional area of VAUX. The sequence is the line header pack, a pre-set number of line data packs for Y, a line header pack and a pre-set number of line data packs for Y, on a line-by-line basis.

The data stored in the line header pack shown in FIG. 20 has the following meaning:

LINES: line numbers to be stored (1 to 1259) in binary notation;

B/W: 0, monochromatic; 1, color (normal);

EN: 0, effective; 1, non-effective;

CLF: color frame number;

CM: 0 common data for the first and second fields, 1, not common;

TSD: total number of samples;

QU: number of quantization bits: 00, 2 bits; 01, 4 bits; 10, 8 bits; 11, undefined;

SAMP: sampling frequencies 000, 13.5 MHz; 001, 27 MHz; 010, 6.75 MHz; 011, 1.35 MHz; 100, 74.25 MHz; 101, 37.125 MHz; other codes, undefined.

It is noted that B/W, EN and CLF are for professional use and arouse, used for pre-recorded video tapes for household use, such as the tape containing the copy protection signal. In this case, these three bits are 111.

The line numbers of the video signals are referred to in two ways. In one, the lines are identified through the first and second fields, such as first to 525th lines for the NTSC system. In the other, the lines are identified separately for the first and second fields, such as a line 21 of the first field or a line 11 of the second field. The CM flag is effective for the second case in which respective lines of the first and second fields have the same position and common contents.

If, for example, CM=0 and LINES=10 are stored in the line header pack, data in the line header pack which follows this line header pack is stored in line 10 of the first field and in line 10 of the second field. In this manner, data can be recorded with one-half the data packs required for separately storing the data of the first and second fields. It is recognized that line 10 of the second field is line 273 of the frame.

TSD specifies to which portion in the data storage area in the line data pack the real data is stored. All 0s, indicating no information is written in the redundant (or non-used) storage area. Since the quantization is 4 bits, and the number of samples is 72 per line in the present embodiment, data is stored in 9 packs.

The copy protection signal is stored in the same positions in the first and second fields, so that the CM flag can be used effectively. Moreover, the copy protection signal is stored somewhere in each of horizontal lines 12 to 20 and 275 to 283 and is eight lines wide in many analog video tapes. Therefore, eight lines of the copy protection signal are stored. Since the copy protection signal has the pack structure, the number of stored lines can be increased or decreased easily, if so desired.

FIG. 22 shows an example of actual data storage. It is assumed that data is stored in lines 13 to 20 of both the first and second fields. Since the storage line numbers can be designated by LINES stored in the line header pack PC1, data need not be stored in contiguous storage lines. The line data is packed in the sequence of the lower four bits and the upper four bits, as shown in FIG. 22.

As shown in FIG. 23 which is an example of storing the line header pack and the line data packs of FIG. 22 in the VAUX optional area, the copy protection signal necessarily exists in one video frame.

Figure 24:
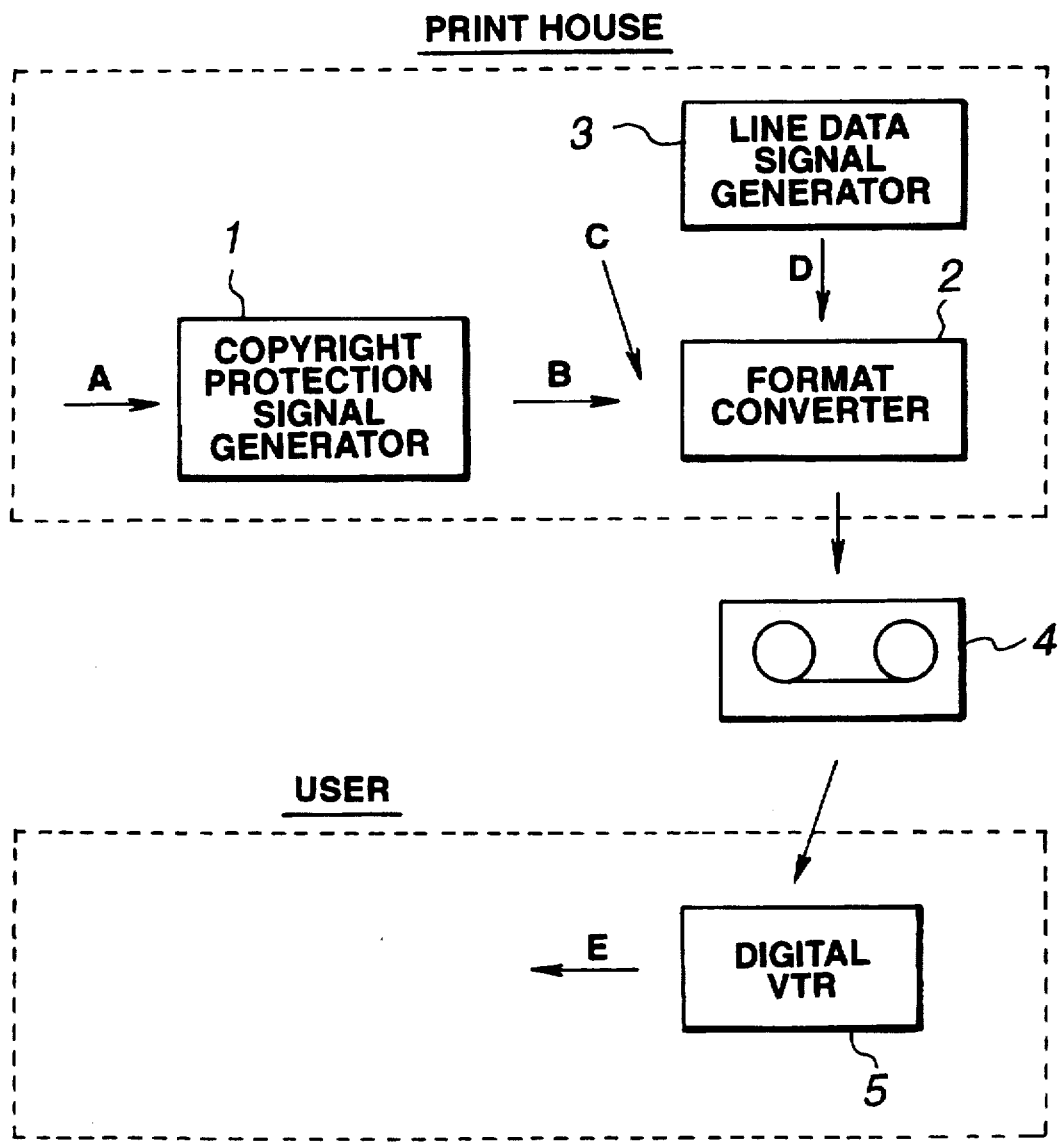
FIG. 24 is a diagram representing the flow of recording and reproduction of line pack data.

An illustration of the recording circuit and the reproducing circuit of the present invention will now be explained. First, reference is made to FIG. 24 showing the flow of recording and reproduction of line pack data.

In a print house, the copy protection signal is inserted conventionally, using a conventional copy protection signal generator 1, in the vertical blanking period in an analog video signal A on a pre-recorded tape 4. An analog video signal B, into which has been inserted the copy protection signal, is transferred to a format converter 2 designed for conversion to the recording format of a digital VTR. To the format converter 2, supplied with analog or digital audio signals, is connected a line data generator 3. The line data generator 3 extracts the copy protection signal shown in FIG. 17 and converts that format into the format shown in FIG. 22 for storage in an optional area of the digital pre-recorded tape.

During reproduction, the user digital VTR 5 detects line pack data stored in the optional area of VAUX of the digital pre-recorded tape and restores the copy protection signal. The user VTR 5 then inserts the restored signal into pre-set lines for outputting the analog video signal E.

Figure 25:
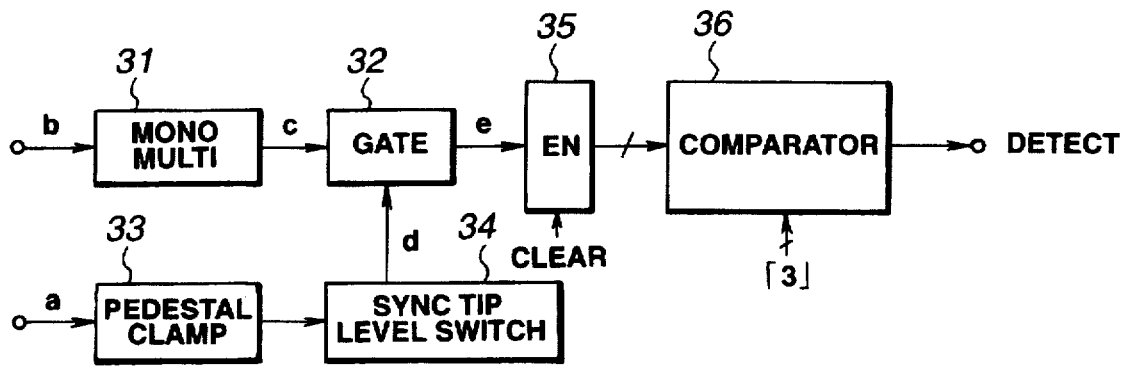
FIG. 25 is a diagram of an example of a structure of a copy protection signal detection circuit.
Figure 26A:
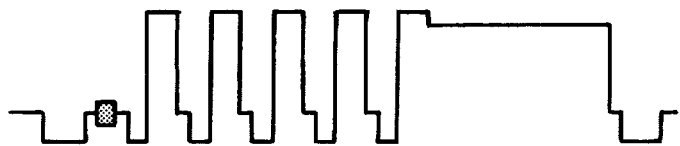
FIGS. 26A, 26B, 26C, 26D and 26E are timing diagrams for illustrating the operation of the copy protection signal detection circuit.
Figure 26B:
Figure 26C:
Figure 26D:
Figure 26E:

The line data generator 3 detects whether or not the copy protection signal has been inserted into the vertical blanking period of the video signal, and samples and stores the inserted copy protection signal in the data pack if the result of detection is affirmative. The copy protection signal detection circuit in the line data generator is configured as shown, for example, in FIG. 25. The timing diagram for the copy protection signal detection circuit is shown in FIG. 26. The signals a to e in FIG. 25 correspond to FIGS. 26A to 26E, respectively. In FIG. 25, a denotes an analog level signal and b-e denote digital signals.

In the copy protection signal detection circuit, the analog composite video signal a has its pedestal dc component clamped by a pedestal clamp circuit 33 to a pre-set constant value. The signal a is supplied in this state to a SYNC tip level slicing circuit 34 which extracts the SYNC tip portion for producing a digital signal d. A horizontal synchronization pulse b, separated from the composite video signal a, is converted by a monostable multivibrator 31 into the waveform signal c shown in FIG. 26C before being supplied to a gating circuit 32. The signal c is gated with signal d outputted by the SYNC tip level slicing circuit 34 to form a signal e which is supplied to a counter 35. The counter 35 is configured to be cleared by the end of the horizontal synchronization signal and counts the number of the pseudo SYNC pulses shown in FIG. 17 line-by-line. An output of the counter 35 is supplied to a comparator 36 fed with, for example, a reference value such as three as a comparison value. When the count value of the counter 35 reaches three, the comparator 36 outputs a detection signal. This method is used for preventing erroneous counting of noise pulses. The presence of the copy protection signal is recognized only when three or more pseudo SYNC pulses, for example, have been counted.

Figure 27:
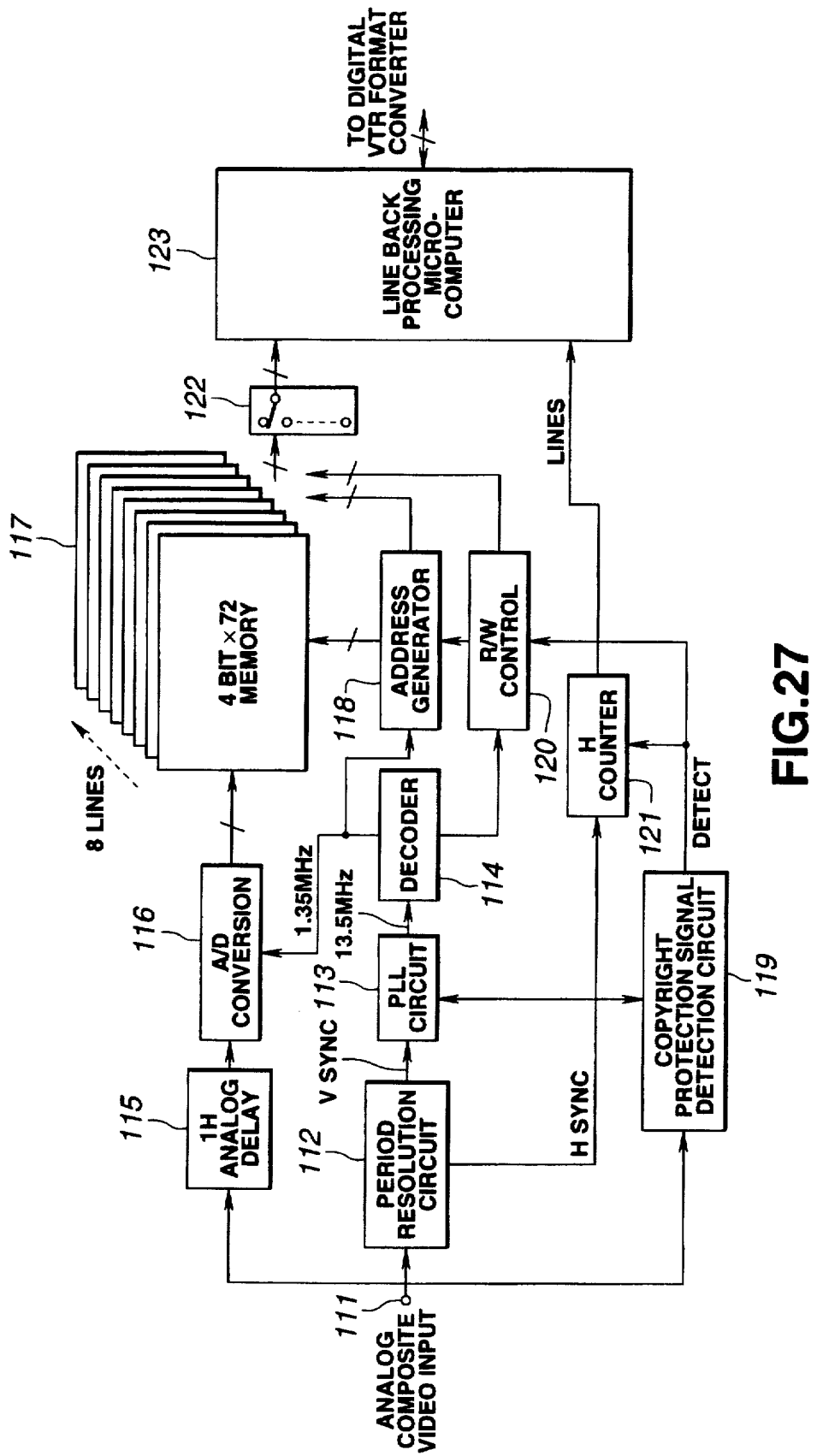
FIG. 27 is a diagram of an illustrative circuit of a line data signal generating circuit.

FIG. 27 shows an illustrative circuit construction of the line data signal generating circuit 3, where the analog composite video signal, entering a terminal 111, is supplied to a synchronization separation circuit 112 where it is stripped of the horizontal synchronization signal H.SYNC and the vertical synchronization signal V.SYNC. Preferably, a monostable multivibrator, for example, is provided for preventing the disturbance by the pseudo SYNC of the copy protection signal.

The separated vertical synchronization signal is supplied to the PLL circuit 113 where reference clock signals of 13.5 MHz are generated. These reference clock signals are sent to a decoding circuit 114 for forming sampling clocks of 1.35 MHz.

A copy protection signal detection circuit 119 is configured as shown in FIG. 25. During the time the copy protection signal detection circuit determines the possible presence of the copy protection signal, the input composite video signal is delayed by a 1H analog delay circuit 115.

An output of the 1H analog delay circuit 115 is digitized by an A/D converter 116. If the copy protection signal detection circuit 119 detects the presence of the copy protection signal, it is written into a memory 117 under the control of a read/write control circuit 120. The memory 117 stores sampling data line by line and has 8 lines of 4 bitsx72 samples. An address generating circuit 118 generates a write/read address and a chip select signal for the memory.

In the present embodiment, it suffices to monitor 20 lines at most of the first field. Thus, the data is packed in the line pack during the remaining period. An H count circuit 121 supplies a line number in case of presence of the copy protection signal as LINES data to a line pack processing microcomputer 123. The data of the memory 117 is supplied as line data to the line pack processing micro-computer 123 as the data is switched by the switching circuit 122. Using this data, the line pack processing micro-computer 123 forms data as shown in FIG. 22 and routes the data to the format converter 2 of FIG. 25.

Figure 28:
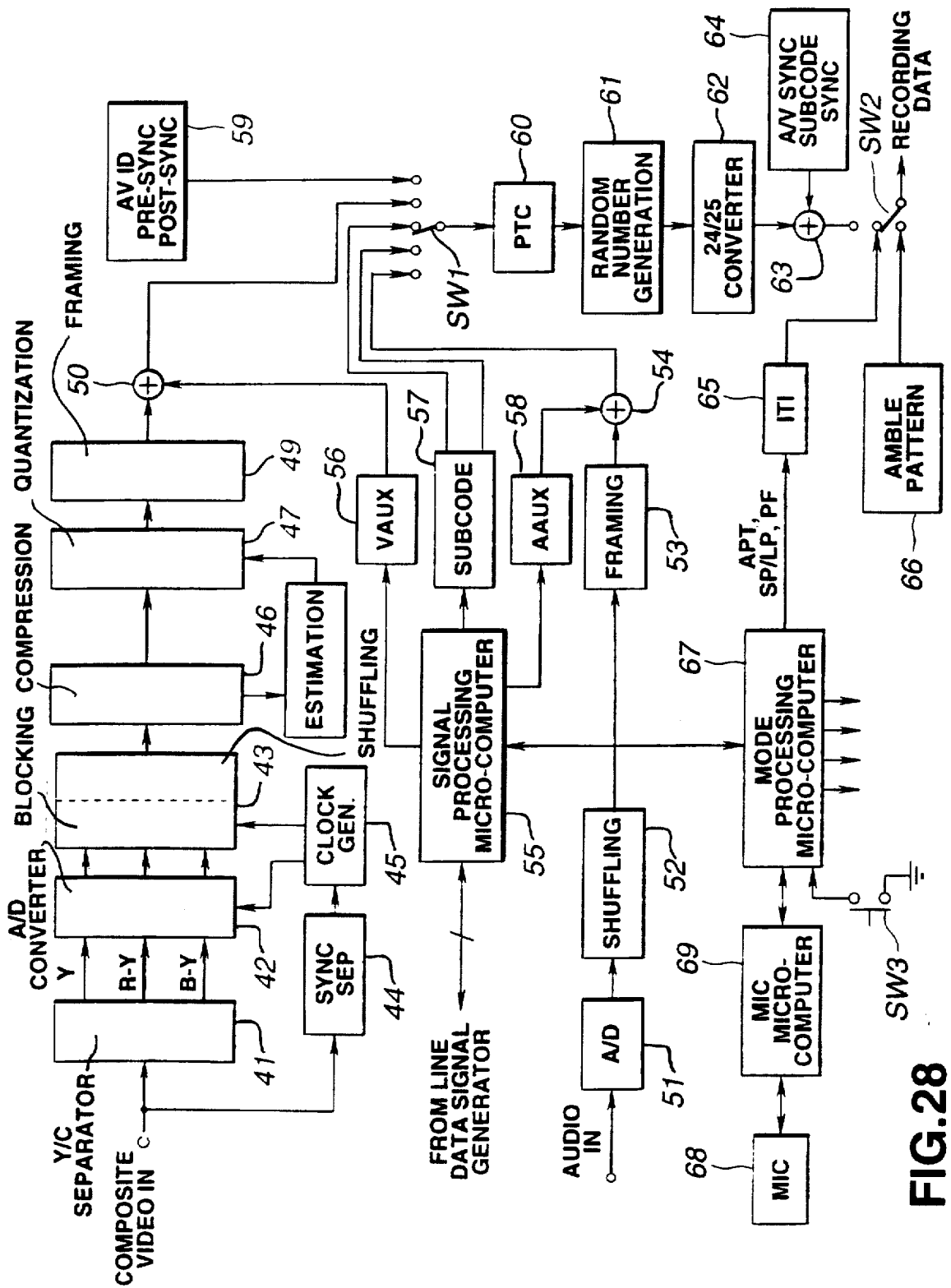
FIG. 28 is a diagram of an example of a format converter.

Referring to FIG. 28, the format converter 2 is explained. The format converter 2 is comprised of a write-only digital VTR, line data and an interface. The input analog composite video signal is separated by a Y/C separation circuit 41 into R-Y and B-Y component signals so as to be supplied to an A/D converter 42. The analog composite video signal is also supplied to a synchronization separation circuit 44 for separating synchronization signals which are supplied to a clock generator 45. The clock generator 45 generates clock signals for an A/D converter 42 and a blocking shuffling circuit 43.

In the case of the 525/60 system, the Y signal and the chroma signal of the component signal entering the A/D converter 42 are digitized at the sampling frequencies of 13.5 MHz and 13.5/4 MHz, respectively. In the case of the 625/50 system, the Y signal and the chroma signal are digitized at the sampling frequencies of 13.5 MHz and 13.5/2 MHz, respectively. Of the A/D converted output data, only data of the effective scanning period is supplied to the blocking shuffling circuit 43.

The blocking shuffling circuit 43 forms a data block composed of 8 samples in the horizontal direction and 8 samples in the vertical direction from the effective data of Y, R-Y and B-Y signals. The blocking shuffling circuit 43 also shuffles six blocks, comprised of four Y blocks, a R-Y block and a B-Y block, as a unit, and routes the resulting data to a compression circuit 46. The compression circuit 46 performs block encoding on the input block data comprised of the eight samples in the horizontal direction and the eight samples in the vertical direction and outputs the results to an estimation unit 48 and a quantizer 47. The quantizer 47 determines the quantization step based on the output of the estimation unit 43 and encodes the data using variable length encoding to output the result to a framing circuit 49. The framing circuit 49 frames the encoded picture data in accordance with a pre-set format and outputs the framed data to an adder 50.

Continuing with the description of FIG. 28, the input audio signal is digitized by an A/D converter 51. The audio data obtained by the A/D converter 51 is rearranged by a shuffling circuit 52 in a form suited for recording on the tape and is framed by a framing circuit 53 in accordance with a predetermined format. An output of the framing circuit 53 is outputted to an adder 54.

The track number stored in the IDs of the pack data of VAUX, AAUX and the sub-code is sent from the line data signal generator to a signal processing micro-computer 55 and then supplied to a VAUX circuit 56, sub-code circuit 57 and to a AAUX circuit 58 operating as an interface between the micro-computer and the peripheral hardware. The VAUX circuit 56 generates pack data for AP2 and outputs the pack data at a pre-set timing to the adder 50. The video data and the video auxiliary data are summed in accordance with a predetermined format. The sub-code circuit 57 generates data SID of the ID portion, AP3 and 5 bytes of pack data SDATA. The AAUX circuit 58 generates an X pack matched to AP1 and outputs the resulting pack at a pre-set timing to the adder 54. This sums the audio data and the audio auxiliary data according to a predetermined format.

Outputs of the adder 50, sub-code circuit 57 and the adder 54 are supplied to a switching circuit SW1. Outputs of the AV ID, pre-SYNC and post-SYNC generator 59 are also supplied to the switching circuit SW1. By switching the switching circuit SW1 at a pre-set timing, pre-SYNC and post-SYNC are appended to the output of the adders 50, 54.

A predetermined parity is appended to the output of the switching circuit SW1 by a parity generator 60. The resulting data is randomized by a randomizing circuit 61 and added with one bit by a 24/25 converter 62 every 214 bits in accordance with a predetermined conversion rule for conversion to the 25-bit data. This removes dc components which cause a problem during magnetic recording/reproduction. Although not shown, $1/1-D^2$ coding of the partial response class 4 (PR4) suitable for digital recording is also performed.

The resulting data is supplied to an adder 63 where it is synthesized with the SYNC pattern of the audio, video and sub-code generated by a SYNC pattern generator 64. An output of the adder 63 is supplied to a switching circuit SW2. The ITI data outputted by an ITI generator 65 and an amble pattern generated by an amble pattern generator 66 are also supplied to the switching circuit SW2. The ITI generator 65, supplied with data of APT, SP/LP and PF from the mode processing micro-computer 67, routes the resulting data to the switching circuit SW2. The switching circuit SW2 sums this data and the amble pattern by switching at a predetermined timing. An output of the switching circuit SW2 is amplified by a recording amplifier, not shown, for recording on a magnetic tape by a magnetic head.

The mode processing micro-computer 67 performs mode management of the entire apparatus. A switching circuit SW3, connected to the mode processing micro-computer 67, sets the SP/LP mode. The result is detected by the mode processing micro-computer 67 and routed to the signal processing micro-computer 55, MIC micro-computer 69 and to a mechanical control micro-computer, not shown.

The MIC micro-computer 69 is a micro-computer for processing the memory in cassette (MIC). Thus the MIC micro-computer generates pack data and APM and routes them via MIC contact to a MIC 68 in the cassette.

Figure 29:
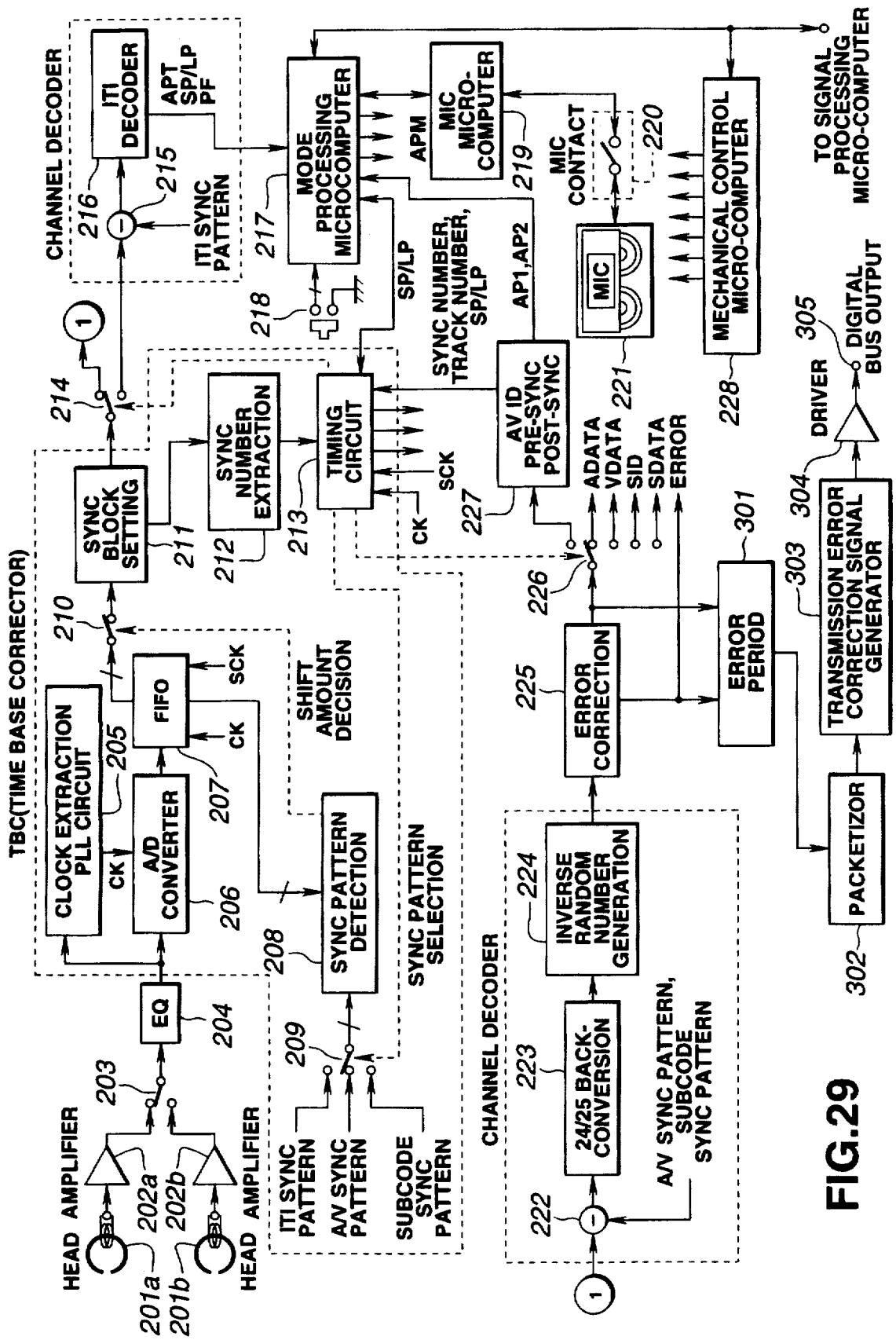
FIG. 29 is a block diagram of a portion of a reproducing circuit.
Figure 30:
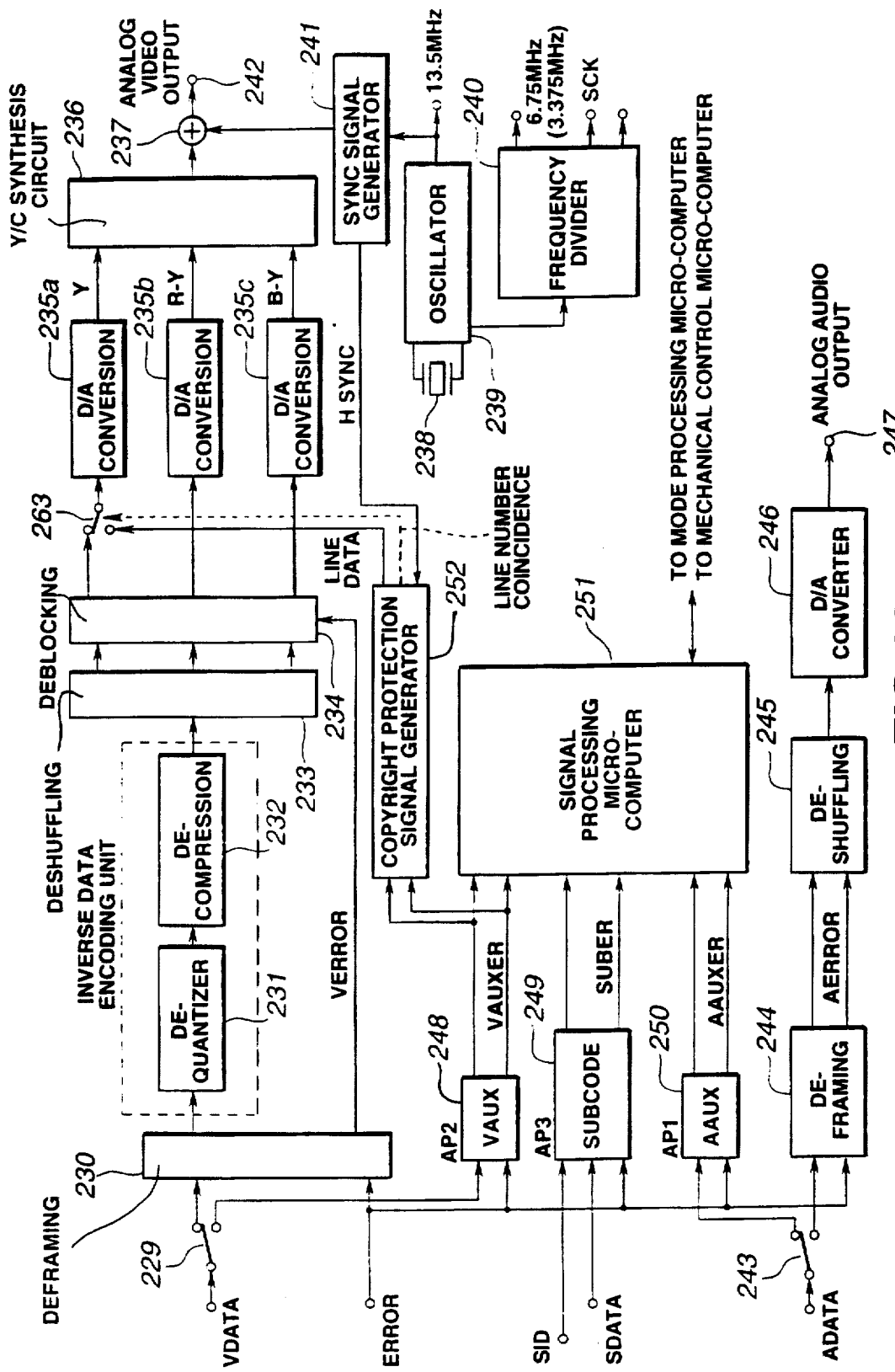
FIG. 30 is a block diagram of another portion of a reproducing circuit.

The reproducing side circuit configured as shown, for example, in FIGS. 29 and 30 is described next. In the reproducing side circuit, shown in FIGS. 29 and 30, playback signals of low intensity, produced from the magnetic tape by heads 201a, 201b, are amplified by head amplifiers 202a, 202b, and supplied via a switch 203 to an equalizer circuit 204. The equalizer circuit 204 performs an operation which is the reverse of the emphasis operation, such as partial response class 4, performed during recording, for improving electromagnetic conversion characteristics of the magnetic head and the magnetic tape.

Clock components are extracted by a clock extraction circuit 205 from an output of the equalizer circuit 204 for generating clock signals CK. Using these clock signals CK, an output of the equalizer circuit 204 is digitized by an A/D converter 206. The resulting 1-bit data is written to a FIFO 207 using the clock signals CK.

The clock signals CK generated by the clock extraction circuit 205 are temporally unstable signals containing jitter components of the rotary head drum. However, the data prior to A/D conversion does not contain jitter components, so that sampling itself does not pose any problems. For extracting picture data, time axis correction is made using the FIFO 207, since only temporally stable data can be extracted. That is, writing is done using the unstable clock signals CK, while readout is done using stable clock signals SCK supplied from a free-running oscillator 239 employing a quartz oscillator 238. The FIFO 207 has a depth sufficient to prevent readout of input data faster than the speed of the input data.

Outputs of the respective stages of the FIFO 207 are supplied to a SYNC pattern detection circuit 208 fed with the SYNC patterns of the respective areas switched by a switch 209 under control by a timing circuit 213. The SYNC pattern detection circuit 208 has a so-called flywheel structure: once a SYNC pattern is detected, it is checked whether or not the same SYNC pattern comes again after a predetermined SYNC block length. If this is true at least three times, correct synchronization detection—not a false detection—has been achieved.

If the SYNC pattern is detected in this manner, the amount of shift is determined, indicating which SYNC block can be taken out by extracting a portion of the output of the respective stages of the FIFO 207. Thus, a switch 210 is accordingly closed and the required bit is taken into a SYNC block latch 211. The SYNC number thus taken is removed by a SYNC number extraction circuit 212 and supplied to a timing circuit 213. The SYNC number indicates which position of the track the head is scanning. The switches 209 and 214 are switched accordingly.

When the head is scanning the ITI sector, the switch 214 is set to the side of a subtractor 215. Thus the ITISYNC pattern is removed by the subtractor 215 and supplied to an ITI decoder 216.

Since the ITI area data is recorded in the coded form, it can be decoded to select APT, SP/LP and PF data. This data is supplied to a mode processing micro-computer 217 to which an actuating switch 218 is connected.

A MIC micro-computer 219 managing the APM or the like is connected to the mode processing micro-computer 217. The information from the MIC in the cassette 221 is supplied to the MIC micro-computer 219 via a MIC contact 220 for MIC processing shared with the mode processing microcomputer 217. Depending on the setting, the MIC computer may be eliminated so that the MIC processing will be handled by the mode processing micro-computer 217. The mode processing microcomputer 217 manages system control for the entire set in cooperation with the mechanical control micro-computer 228 or the signal processing micro-computer 251.

When the head is scanning the A/V sector or the sub-code sector, the switch 214 is set to the side of the subtractor 222. After extracting the SYNC patterns of the respective sectors by the subtractor 222, the SYNC patterns are passed through a 24/25 back-conversion circuit 223 and through a derandomizing circuit 224 for restoring the original data string. The data string is then supplied to an error correction circuit 225.

The error correction circuit 225 detects and corrects data errors using the parity appended on the recording side. The data with uncorrectable errors is outputted along with error flags. The respective data is switched by the switch 226 and outputted. The extraction circuit 227 controls an ID portion of the A/V sector, pre-SYNC and post-SYNC, and extracts the SYNC number, track number and the SP/LP stored in the pre-SYNC. These signals are supplied to the timing circuit 213 to be used for generating various timings.

The extraction circuit 227 extracts AP1 and AP2 and routes them to the mode processing micro-computer 217. The mode processing micro-computer 217 performs format check of AP1 and AP2. If AP1 and AP2=000, the areas 1 and 2 are defined as being a speech data area and a picture data area, respectively, and the operation occurs in the usual manner. Otherwise, the micro-processor performs a warning operation.

As for SP/LP, the mode processing micro-computer 217 performs comparative check with what has been acquired from the ITI area. In the TIA area of the ITI area, the SP/LP information is written thrice for improving the reliability. There are two pre-SYNC pulses in the audio data and two pre-SYNC pulses in the video data, so that SP/LP information is written in four positions again for improving reliability. If non-coincidence occurs ultimately, the data from the ITI area is preferentially used.

The VDATA outputted by the switch 226 is divided by a switch 229, as shown in FIG. 30, into video data and VAUX data. The video data is supplied along with the error flag to a deframing circuit 230.

The deframing circuit 230 performs back conversion of the framing performed on the recording side, and determines the contents of data packed therein. If there is any uncorrectable error in the data, it decides how such error affects other data. Therefore, the deframing circuit 230 performs propagation error processing. Thus, the error flag becomes the VERROR flag containing new propagation error. The deframing circuit 230 also erases an error flag by operating on the picture data containing an error if the data is not crucial for picture reproduction.

The video data is restored by the data decoding unit to pre-compressed data by a dequantization circuit 231 and a decompression circuit 232. The data is then restored to the original picture space arrangement based on the VERROR flag. In the real picture space, picture correction can be performed on the basis of the VERROR flag. Such a processing is performed in which picture data of the previous frames is stored at all times in a memory and an erroneous picture block is replaced by previous picture data.

In the deshuffling circuit 233 and in the downstream side circuits, data is divided into three signals, namely luminance signals Y and chroma signals R-Y and B-Y and processed separately. The three groups of data are restored by D/A converters 235a, 235b and 235c into the analog luminance signal Y and two chroma signals R-Y and B-Y. At this time, the clock signals of 13.5 MHz obtained by the oscillation circuit 239 connected to the quartz oscillator 238 are used as the luminance signal Y, while clock signals of 6.75 MHz or 3.375 MHz, obtained by frequency division by a frequency divider 244, are used as chroma signals R-Y and B-Y.

The three signal components thus obtained are combined by a Y/C combining circuit 236 and summed in an adder 237 to a composite synchronization signal from a synchronization signal generator 241 to form a composite video signal which is outputted at an analog video output terminal 242.

The ADATA outputted by the switch 226 is divided by a switch 243 into audio data and AAUX data as shown in FIG. 30. The audio data is supplied, along with an error flag, to a deframing circuit 244.

The deframing circuit 244 reads the contents of data packed at the time of performing the reverse operation of deframing on the recording side. If there is any uncorrectable error in data, the deframing circuit 244 determines how it affects other data. Thus the deframing circuit performs propagation error processing. In case of 16-bit sampling, one error flag controls two data bytes, since each data byte is 8 bits. Thus, the error flag becomes an AERROR flag containing propagation error.

The audio data is restored by a deshuffling circuit 245 to the original time-domain data. Audio data correction is performed at this time based on the AERROR flag. For example, an error is replaced by a sound immediately preceding the error by way of previous value holding. If an error period is too long to permit correction, the sound itself is stopped by muting.

The processed audio data is converted to an analog value by the D/A converter 246, and outputted at an analog audio output terminal 247, as timing is taken to coincide with picture data.

The VAUX data and AAUX data, divided by the switches 229, 243, are pre-processed by the VAUX circuit 248 and the AAUX circuit 250. The pack data SDATA and ID data SID of the sub-code sector are also pre-processed by the sub-code circuit 249. The data thus pre-processed is sent to a signal post-processing micro-computer 251 for performing final read-out. The errors not corrected by the pre-processing are supplied as VAUXER, SUBER and AAUXER to the signal processing micro-computer 251.

The sub-code circuit 249 extracts AP3 and sends it via signal processing micro-computer 251 to the mode processing micro-computer 217. The mode processing micro-computer 217 performs format check of AP3. If AP3=000, the area 3 is defined as the sub-code area and operates as usual. Otherwise, a warning, such as alarm sound, is produced.

Each area has a main area and an optional area. In the 525/60 Hz system, the same data is written ten times in the same main area. Therefore, if some of the data is erroneous, the remaining data is used, so that the error flags thereat indicate no error. However, data is written only once for the optional area other than the sub-code, so that the error is left as VAUXER and AAUXER.

The signal processing micro-computer 251 based on the previous and subsequent packs of the data pack, performs correction of propagation errors and data correction. The results are supplied to the mode processing micro-computer 217 for determining the behavior of the entire set.

Figure 31:
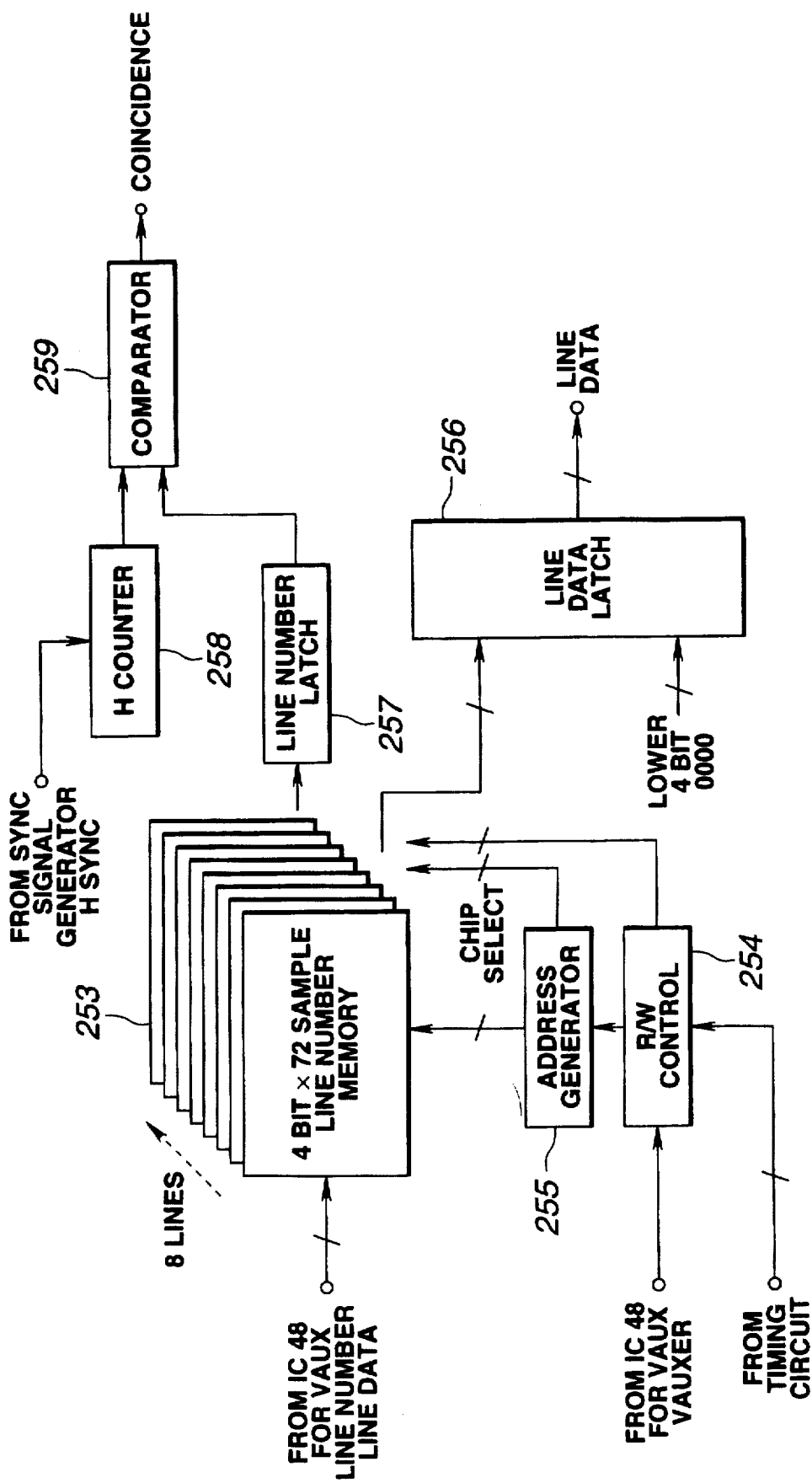
FIG. 31 is a diagram of an example of a copy protection signal generating circuit.

The copy protection signal generating circuit 252 is responsive to the VAUX circuit 248, synchronization signal generator 241 and the timing circuit 213. Based on a line number coincidence signal, the copy protection signal generating circuit 252 controls the switch 253 for supplying a line data output to a D/A converter 235a. This inserts the copy protection signal shown in FIG. 17 into a predetermined line. FIG. 31 shows an illustrative structure of the copy protection signal generating circuit 252.

The copy protection signal generating circuit 252 upon reading line data from a pre-set storage area, immediately determines the contents thereof and selects line data from the line data pack for Y from the LINES data. This line data is stored in a memory 253. The contents of the memory 253 needs to be cleared only once when the power of the VTR is turned on. By not writing data in the memory 253 during VAUXER, the previously written data can be used in substitution for the error data. Such error correction becomes possible since the copy protection signal is not changed drastically from frame to frame, as described above, and exhibits high correlation with the previous frame.

The memory 253 is controlled by the read/write control circuit 254. Moreover, the memory 253 has eight lines of 4 bits by 72 samples since it stores line-based sampling data. Meanwhile, the address generating circuit 255 generates the write address and the chip select signal for the memory 253.

The data written in the memory 253 is held in a line data latch circuit 256 by setting lower four bits to "0000". The line number is also held in a stand-by state in a line number latch circuit 257. The possible coincidence between the count value by an H counter 258 for the horizontal synchronization signal prepared by the synchronization signal generating circuit 241 and the line number latched by the line number latch circuit 255 is checked by a comparator 259. In case of coincidence, the switch 253, as shown in FIG. 30, is set to the side of the copy protection signal generating circuit 252 for inserting line data at the timing of the timing circuit 213.

Figure 32:
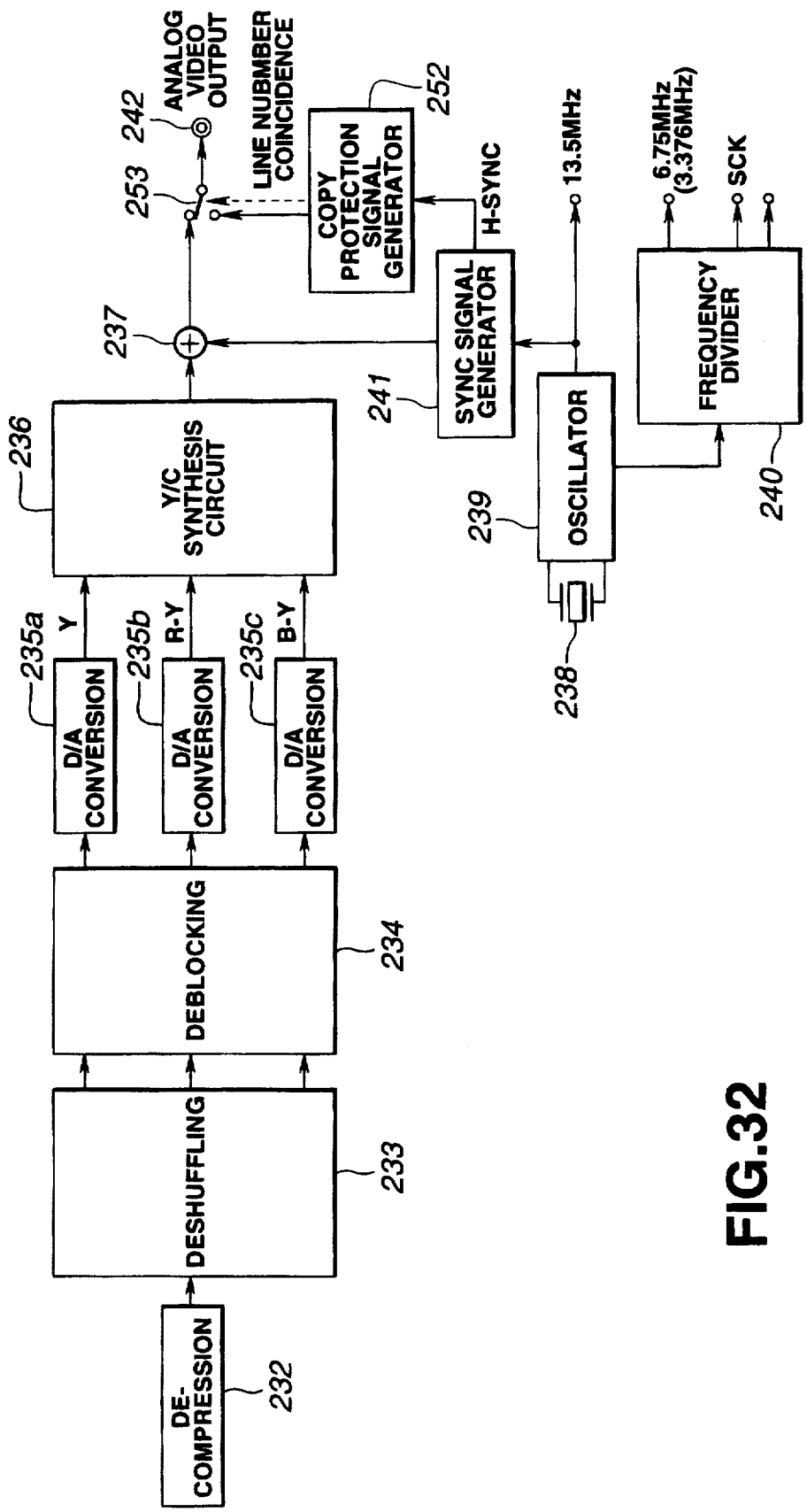
FIG. 32 is a diagram of a circuit for synthesizing an AGC disturbance signal as a copy protection signal.

As shown in FIG. 32, the switch 253 may also be provided on an output side of the adder 237 for adding the analog AGC disturbance signal as a copy protection signal.

Figure 33:
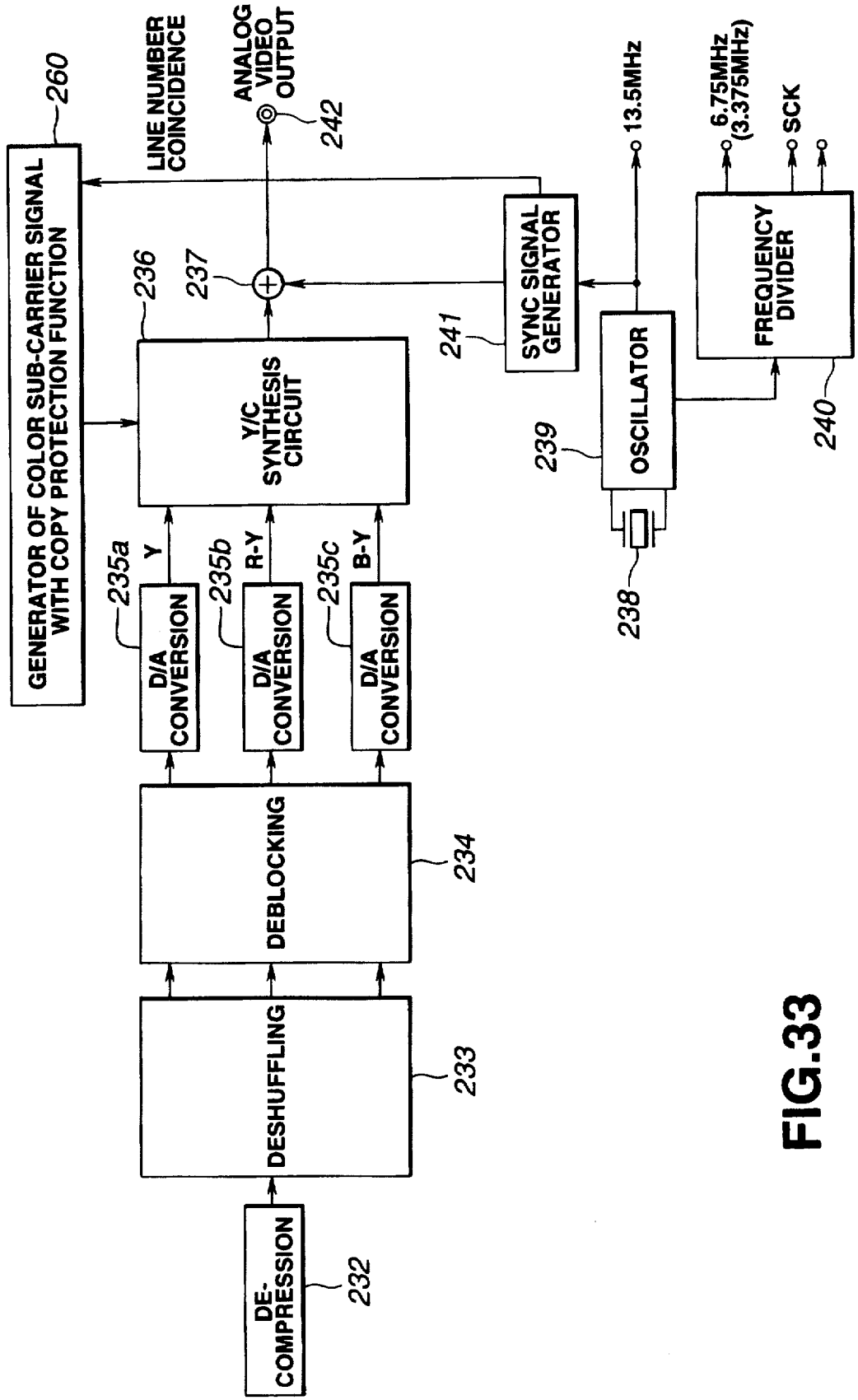
FIG. 33 is a diagram of a circuit for inserting a color stripe disturbance signal.

For inserting the color stripe disturbance signal, a color subcarrier generator having the copy protection signal function 260, as shown in FIG. 33, is provided for reversing the phase of the color subcarrier supplied to the Y/C synthesis circuit 236 at a desired line and otherwise synthesizing the color subcarrier of the normal phase.

The AGC disturbance signal and the color stripe disturbance signal are added by the copy protection signal detection circuit 119 of FIG. 27.

What is claimed is:

1. A method for recording and reproducing on a recording medium a digital picture signal using a format which includes a picture recording area for storing said digital picture signal and an auxiliary recording area for auxiliary information configured in packs, said method comprising the steps of:

detecting an analog copy protection signal from an analog video signal by counting pseudo sync pulses in a horizontal synchronization period and comparing the counted pseudo sync pulses to a predetermined threshold value such that said analog copy protection signal is detected if the number of the counted pseudo sync pulses exceeds said predetermined threshold value, wherein said analog video signal includes an analog picture signal and said analog copy protection signal;

recording a disturbance signal generating flag in said auxiliary recording area in response to the detected analog copy protection signal;

converting said analog picture signal into said digital picture signal for recording in said picture recording area;

reproducing said analog picture signal from said picture recording area;

obtaining said disturbance signal generating flag from said auxiliary recording area; and inserting a disturbance signal into said reproduced analog picture signal to disturb subsequent recording thereof, said disturbance signal being a function of said obtained disturbance signal generating flag.

2. The method according to claim 1, further comprising the step of providing another flag to indicate whether said disturbance signal is to be inserted into a vertical blanking period of said reproduced analog picture signal.

3. The method according to claim 1, wherein said disturbance signal is an automatic gain control (AGC) signal.

4. The method according to claim 1, wherein said disturbance signal is a color striping signal.

5. An apparatus for recording and reproducing on a recording medium a digital picture signal using a format which includes a picture recording area for storing said digital picture signal and an auxiliary recording area for auxiliary information configured in packs, said apparatus comprising:

means for detecting an analog copy protection signal from an analog video signal by counting pseudo sync pulses in a horizontal synchronization period and comparing the counted pseudo sync pulses to a predetermined threshold value such that said analog copy protection signal is detected if the number of the counted pseudo sync pulses exceeds said predetermined threshold value, wherein said analog video signal includes an analog picture signal and said analog copy protection signal;

means for recording a disturbance signal generating flag in said auxiliary recording area in response to the detected analog copy protection signal;

means for converting said analog picture signal into said digital picture signal for recording in said picture recording area;

means for reproducing said analog picture signal from said picture recording area;

means for obtaining said disturbance signal generating flag from said auxiliary recording area; and means for inserting a disturbance signal into said reproduced analog picture signal to disturb subsequent recording thereof, said disturbance signal being a function of said obtained disturbance signal generating flag.

6. The apparatus according to claim 5, further comprising means for providing another flag to indicate whether said disturbance signal is to be inserted into vertical blanking period of said reproduced analog picture signal.

7. The apparatus according to claim 5, further comprising means for transferring said disturbance signal generating flag via a digital interface.

8. The apparatus according to claim 5, wherein said disturbance signal is an automatic gain control (AGC) signal.

9. The apparatus according to claim 5, wherein said disturbance signal is a color striping signal.

* * * * *